United States Patent
Nakamura et al.

(10) Patent No.: US 9,686,566 B2
(45) Date of Patent: Jun. 20, 2017

(54) MOVING PICTURE DECODING DEVICE, MOVING PICTURE DECODING METHOD, MOVING PICTURE DECODING PROGRAM, AND RECEIVING DEVICE

(71) Applicant: JVC KENWOOD Corporation, Yokohama-shi (JP)

(72) Inventors: Hiroya Nakamura, Yokosuka (JP); Hideki Takehara, Yokosuka (JP); Shigeru Fukushima, Yokosuka (JP); Motoharu Ueda, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 315 days.

(21) Appl. No.: 14/266,432

(22) Filed: Apr. 30, 2014

(65) Prior Publication Data

US 2014/0233651 A1   Aug. 21, 2014

Related U.S. Application Data

(63) Continuation of application No. PCT/JP2012/006981, filed on Oct. 31, 2012.

(30) Foreign Application Priority Data

Oct. 31, 2011 (JP) .................. 2011-239396
Oct. 31, 2011 (JP) .................. 2011-239397
(Continued)

(51) Int. Cl.
*H04N 7/12* (2006.01)
*H04N 19/593* (2014.01)
(Continued)

(52) U.S. Cl.
CPC ......... *H04N 19/593* (2014.11); *H04N 19/503* (2014.11); *H04N 19/513* (2014.11); *H04N 19/52* (2014.11); *H04N 19/70* (2014.11)

(58) Field of Classification Search
None
See application file for complete search history.

(56) References Cited

U.S. PATENT DOCUMENTS

2009/0177952 A1* 7/2009 Yokosato ....... H04N 21/234309
                                                                714/799
2012/0320984 A1* 12/2012 Zhou ..................... H04N 19/50
                                                                375/240.16

FOREIGN PATENT DOCUMENTS

JP     2004-129191      4/2004

OTHER PUBLICATIONS

Zhou et al. (Document: JCTVC-F068, Joint Collaborative Team on Video Coding (JCT-VC) of ITU-T SG16 WP3 and ISO/IEC JTC1/SC29/WG11 6th Meeting: Torino, IT, Jul. 14-22, 2011).*

(Continued)

*Primary Examiner* — Dakshesh Parikh
(74) *Attorney, Agent, or Firm* — Venable LLP; Michael A. Sartori; Laura G. Remus

(57) ABSTRACT

A prediction information derivation unit derives inter prediction information candidates from inter prediction information of coded prediction blocks neighboring a prediction block subject to coding within the same picture as the prediction block subject to coding and inter prediction information of a prediction block in a coded picture that is different from the prediction block subject to coding. The prediction information derivation unit determines an inter prediction information candidate to be used for inter prediction of the prediction block subject to coding from the inter prediction information candidates that have been derived. A second bitstream generation unit codes an index (Continued)

that indicates the inter prediction information candidate based on the number of the inter prediction information candidates.

3 Claims, 29 Drawing Sheets

(30) Foreign Application Priority Data

Oct. 30, 2012 (JP) .................................. 2012-239266
Oct. 30, 2012 (JP) .................................. 2012-239267

(51) Int. Cl.
*H04N 19/52* (2014.01)
*H04N 19/503* (2014.01)
*H04N 19/70* (2014.01)
*H04N 19/513* (2014.01)

(56) References Cited

OTHER PUBLICATIONS

Minhua Zhou et al., "A study on HM3.0 parsing throughput issue," Joint Collaborative Team on Video Coding (JCT-VC) on ITU-T SG16 WP3 and ISO/IEC JTC1/SC29/WG11, JCTVC-F068, 6th Meeting: Torino, IT, Jul. 2011, pp. 1-17.

Hiroya Nakamura et al., "Non-CE13: The maximum number of merging candidates in P-slice," Joint Collaborative Team on Video Coding (JCT-VC) on ITU-T SG16 WP3 and ISO/IEC JTC1/SC29/WG11, JCTVC-G221, 7th Meeting: Geneva, CH, Nov. 2011, pp. 1-4.

International Search Report in PCT International Application No. PCT/JP2012/006981, dated Jan. 15, 2013.

International Preliminary Report on Patentability and Written Opinion in PCT International Application No. PCT/JP2012/006981, dated May 6, 2014.

* cited by examiner

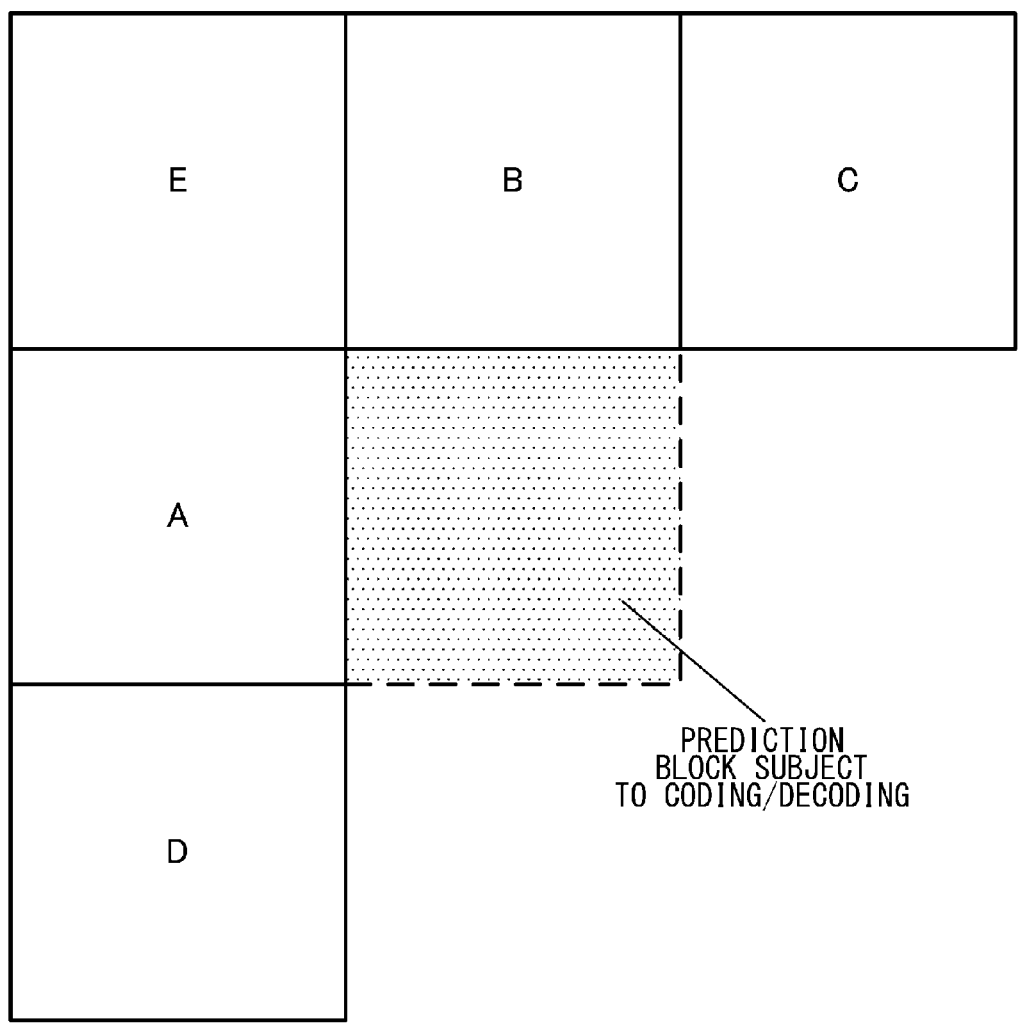

FIG.10

```
PREDICTION BLOCK
if (PredMode == MODE_INTER) {
  merge_flag [ x0 ][ y0 ]
  if( merge_flag[ x0 ][ y0 ] ) {
    merge_idx [ x0 ][ y0 ]
  } else {
    if( slice_type == B )
      inter_pred_flag[ x0 ][ y0 ]
    if( inter_pred_flag[ x0 ][ y0 ] == Pred_L0 || inter_pred_flag[ x0 ][ y0 ] == Pred_BI ) {
      if( num_ref_idx_l0_active_minus1 > 0 )
        ref_idx_l0[ x0 ][ y0 ]
      mvd_l0[ x0 ][ y0 ][ 0 ]
      mvd_l0[ x0 ][ y0 ][ 1 ]
      mvp_idx_l0[ x0 ][ y0 ]
    }
    if( inter_pred_flag[ x0 ][ y0 ] == Pred_L1 || inter_pred_flag[ x0 ][ y0 ] == Pred_BI ) {
      if( num_ref_idx_l1_active_minus1 > 0 )
        ref_idx_l1[ x0 ][ y0 ]
      mvd_l1[ x0 ][ y0 ][ 0 ]
      mvd_l1[ x0 ][ y0 ][ 1 ]
      mvp_idx_l1[ x0 ][ y0 ]
    }
    ...
  }
}
```

FIG.11

| MERGE INDEX mergeIdx | NUMBER OF MERGE CANDIDATES finalNumMergeCand | | | |
|---|---|---|---|---|
| | 3 | 4 | 5 | |
| 0 | 0 | 0 | 0 | |
| 1 | 10 | 10 | 10 | |
| 2 | 11 | 110 | 110 | |
| 3 | – | 111 | 1110 | |
| 4 | – | – | 1111 | |

```
slice_type
......

if (slice_type == P || slice_type == B) {
    ......
    num_merge_cand              /* SET ONLY FOR SECOND EXEMPLARY EMBODIMENT */
    max_num_spatial_merge_cand  /* OPTION */
......
}
......

if (slice_type == B) {
    ......
    collocated_from_l0_flag
    ......
}
......
```

MOVING PICTURE DECODING DEVICE, MOVING PICTURE DECODING METHOD, MOVING PICTURE DECODING PROGRAM, AND RECEIVING DEVICE

BACKGROUND OF THE INVENTION

1. Field of the Invention

The present invention relates to a technology of coding and decoding moving pictures and, more particularly, to a technology of coding and decoding moving pictures by using motion compensation prediction.

2. Description of the Related Art

The MPEG-4 AVC/H.264 standard is known as a typical method for compression coding of moving pictures. In motion compensation according to MPEG-4 AVC/H.264, a picture is partitioned into a plurality of rectangular blocks. A picture already coded and decoded is used as a reference picture. Motion from the reference picture is predicted. Motion prediction based on motion compensation is referred to as inter prediction or motion compensation prediction. In inter prediction according to MPEG-4 AVC/H.264, a plurality of pictures can be used as reference pictures. For motion compensation, an optimum reference for each block picture is selected from the plurality of reference pictures. A reference index is assigned to each reference picture. A reference picture is identified by the reference index. In a B picture, a maximum of two pictures may be selected from the reference pictures already coded and decoded and may be used for inter prediction. Prediction from one of the two reference pictures is denoted by L0 prediction (list 0 prediction), which is primarily used for forward prediction, and prediction from the other is denoted by L1 prediction (list 1 prediction), which is primarily used for backward prediction.

Bi-prediction, which uses two types of inter prediction, i.e., L0 prediction and L1 prediction, is also defined. In the case of bi-prediction, two predictions are performed. Inter prediction signals from L0 prediction and L1 prediction are multiplied by respective weight factors, and offset values are added to the respective results of multiplication. The resultant signals are superimposed on each other to produce an ultimate inter prediction picture signal. Typical values of weight factors and offset values used for weighted prediction are defined and coded in units of pictures and for each reference picture in a list. Coding information related to inter prediction defined for each block includes a prediction mode for distinguishing between L0 prediction, L1 prediction, and bi-prediction. Coding information defined for each reference list for a given block includes a reference index identifying a reference picture, and a motion vector indicating the direction and amount of movement of the block. These items of coding information are coded and decoded.

Further, in MPEG-4 AVC/H.264, a direct mode is defined where inter prediction information of a block to be coded or decoded is generated from inter prediction information of a block that has been coded or decoded. Coding of inter prediction information is unnecessary in the direct mode. Thus, coding efficiency is improved.

An explanation will be made using FIG. 29 regarding a temporal direct mode where the correlation of inter prediction information in a temporal direction is used. A picture having an L1 reference index added as zero is referred to as a reference picture colPic. A block located at the same position as a coding or decoding target block in the reference picture colPic is referred to as a reference block.

If the reference block has been coded using L0 prediction, the L0 motion vector of the reference block is referred to as a reference motion vector mvCol. If the reference block has not been coded using L0 prediction, and if the reference block has been coded using L1 prediction, the L1 motion vector of the reference block is referred to as the reference motion vector mvCol. A picture referred to by the reference motion vector mvCol is referred to as an L0 reference picture in the temporal direct mode, and the reference picture colPic is referred to as an L1 reference picture in the temporal direct mode.

By scaling operation processing, an L0 motion vector mvL0 and an L1 motion vector mvL1 in the temporal direct mode are derived from the reference motion vector mvCol.

An inter-picture distance td is derived by subtracting the POC of the L0 reference picture in the temporal direct mode from the POC of the reference picture colPic. POC is a variable mapped to a coded picture. A value incremented by 1 at a time in an output sequence of a picture is set in POC. A difference in POC between two pictures shows an inter-picture distance in a time axis direction.

$$td=(\text{POC of reference picture colPic})-(\text{POC of }L0\text{ reference picture in temporal direct mode})$$

The inter-picture distance td is derived by subtracting the POC of the L0 reference picture in the temporal direct mode from the POC of a picture subject to coding or decoding.

$$tb=(\text{POC of picture subject to coding or decoding})-(\text{POC of }L0\text{ reference picture in temporal direct mode})$$

By scaling operation processing, an L0 motion vector mvL0 in the temporal direct mode is derived from the reference motion vector mvCol.

$$mvL0 = tb/td * mvCol$$

The L1 motion vector mvL1 is derived by subtracting the reference motion vector mvCol from the L0 motion vector mvL0 in the temporal direct mode.

$$mvL1 = mvL0 - mvCol$$

[Patent document 1] JP 2004-129191

In conventional methods, the number of motion information candidates that are referred to for each block by motion compensation is fixed conventionally, and there are thus cases where coding efficiency is not improved.

In this background, the inventors of the present invention have come to be aware of a need to provide a moving picture coding scheme based on motion compensation prediction in which the coding information is further compressed and the overall code size is reduced.

SUMMARY OF THE INVENTION

Accordingly, a purpose of the present invention is to provide a moving picture coding and decoding technology capable of reducing the code size of coding information and improving the coding efficiency accordingly, by deriving coding information candidates.

A moving picture coding device according to one embodiment of the present invention is adapted to code, by using inter prediction, moving pictures in units of blocks obtained by partitioning each picture, and comprises: a prediction information derivation unit (104) configured to derive inter prediction information candidates from inter prediction information of coded prediction blocks neighboring a prediction block subject to coding within the same picture as the prediction block subject to coding and inter prediction information of a prediction block in a coded picture that is different from the prediction block subject to coding; a decision unit (107) configured to determine an inter prediction information candidate to be used for inter prediction of the prediction block subject to coding from the inter prediction information candidates that have been derived; a first coding unit (118) configured to code a syntax element that indicates the number of the inter prediction information candidates; and a second coding unit (110) configured to code an index that indicates the inter prediction information candidate determined by the decision unit, based on the number of the inter prediction information candidates.

Another embodiment of the present invention relates to a moving picture coding device. The device is adapted to code moving pictures in units of blocks obtained by partitioning each picture of the moving pictures, by using motion compensation prediction, and comprises: a prediction information derivation unit (104) configured to derive inter prediction information candidates from inter prediction information of prediction blocks neighboring a prediction block subject to coding or a prediction block that exists at the same position as or near a prediction block subject to coding in a coded picture located at a point of time different from the prediction block subject to coding; a candidate number control unit (135) configured to limit the number of the inter prediction information candidates according to at least either one of a profile that indicates a group of processing functions and a level that indicates decoding processing ability; a motion compensation prediction unit (105) configured to select a single inter prediction information candidate from the limited number of the inter prediction information candidates and to perform inter prediction of the prediction block subject to coding by the inter prediction information candidate thus selected; and a coding unit (118) configured to code a syntax element that indicates the number of inter prediction information candidates used to limit the number of the candidates.

Yet another embodiment of the present invention relates to a moving picture coding method. The method is adapted to code, by using inter prediction, moving pictures in units of blocks obtained by partitioning each picture, and comprises: deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding; determining an inter prediction information candidate to be used for inter prediction of the prediction block subject to coding from the inter prediction information candidates that have been derived; coding a syntax element that indicates the number of the inter prediction information candidates; and coding an index that indicates the inter prediction information candidate determined by the determination, based on the number of the inter prediction information candidates.

Yet another embodiment of the present invention relates to a transmitting device. The device comprises: a packet processing unit configured to packetize a bitstream coded by a moving picture coding method adapted to code, by using inter prediction, moving pictures in units of blocks obtained by partitioning each picture so as to obtain coded data; and a transmitting unit configured to transmit the coded data that has been packetized. The moving picture coding method includes: deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding; determining an inter prediction information candidate to be used for inter prediction of the prediction block subject to coding from the inter prediction information candidates that have been derived; coding a syntax element that indicates the number of the inter prediction information candidates; and coding an index that indicates the inter prediction information candidate determined by the determination, based on the number of the inter prediction information candidates.

Still another embodiment of the present invention relates to a transmitting method. The method comprises: packetizing a bitstream coded by a moving picture coding method adapted to code, by using inter prediction, moving pictures in units of blocks obtained by partitioning each picture so as to obtain coded data; and transmitting the coded data that has been packetized. The moving picture coding method includes: deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding; determining an inter prediction information candidate to be used for inter prediction of the prediction block subject to coding from the inter prediction information candidates that have been derived; coding a syntax element that indicates the number of the inter prediction information candidates; and coding an index that indicates the inter prediction information candidate determined by the determination, based on the number of the inter prediction information candidates.

A moving picture decoding device according to one embodiment of the present invention is adapted to decode a bitstream in which moving pictures are coded, by using inter prediction, in units of blocks obtained by partitioning each picture, and comprises: a prediction information derivation unit (205) configured to derive inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding; a first decoding unit (212) configured to decode a syntax element that indicates the number of the inter prediction information candidates so as to derive the number of the inter prediction information candidates; a second decoding unit (202) configured to decode an index that indicates an inter prediction information candidate to be used for inter prediction of the prediction block subject to decoding based on the number of the inter prediction information candidates derived by the first decoding unit; and a selection unit (237) configured to select the inter prediction information candidate indicated by the index from the inter prediction information candidates derived by the prediction information derivation unit.

Another embodiment of the present invention also relates to a moving picture decoding device. The device is adapted to decode a bitstream in which moving pictures are coded in units of blocks obtained by partitioning each picture of the moving pictures, by using motion compensation prediction, and comprises: a prediction information derivation unit (205) configured to derive inter prediction information candidates from inter prediction information of prediction blocks neighboring a prediction block subject to decoding or a prediction block that exists at the same position as or near a prediction block subject to decoding in a decoded picture located at a point of time different from the prediction block subject to decoding; a first decoding unit (212) configured to decode a syntax element that indicates the number of the inter prediction information candidates so as to derive the number of the inter prediction information candidates; a candidate number control unit (235) configured to limit the number of the inter prediction information candidates by using the number of the inter prediction information candidates derived by the first decoding unit; a second decoding unit (202) configured to decode an index that indicates the inter prediction information candidate, which serves as inter prediction information of the prediction block subject to decoding, based on the number of the inter prediction information candidates derived by the first decoding unit; and a motion compensation prediction unit (206) configured to select the inter prediction information candidate indicated by the index that has been decoded from the limited number of the inter prediction information candidates and to perform inter prediction of the prediction block subject to decoding by the inter prediction information candidate thus selected.

Another embodiment of the present invention relates to a moving image decoding method. The method is adapted to decode a bitstream in which moving pictures are coded, by using inter prediction, in units of blocks obtained by partitioning each picture, and comprises: deriving inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding; decoding a syntax element that indicates the number of the inter prediction information candidates so as to derive the number of the inter prediction information candidates; decoding an index that indicates an inter prediction information candidate to be used for inter prediction of the prediction block subject to decoding based on the number of the inter prediction information candidates derived by the first decoding; and selecting the inter prediction information candidate indicated by the index from the inter prediction information candidates derived by the deriving of the inter prediction information candidates.

Yet another embodiment of the present invention relates to a receiving device. The device is adapted to receive a bitstream in which moving pictures are coded and to decode the received bitstream, and comprises: a receiving unit configured to receive coded data obtained by packetizing the bitstream in which moving pictures are coded, by using inter prediction, in units of blocks obtained by partitioning each picture; a reconstruction unit configured to reconstruct an original bitstream by processing packets of the coded data that has been received; a prediction information derivation unit (205) configured to derive inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding; a first decoding unit (212) configured to decode a syntax element that indicates the number of the inter prediction information candidates from the bitstream that has been reconstructed so as to derive the number of the inter prediction information candidates; a second decoding unit (202) configured to decode an index that indicates an inter prediction information candidate to be used for inter prediction of the prediction block subject to decoding based on the number of the inter prediction information candidates derived by the first decoding unit from the bitstream that has been reconstructed; and a selection unit (237) configured to select the inter prediction information candidate indicated by the index from the inter prediction information candidates derived by the prediction information derivation unit.

Still another embodiment of the present invention relates to a receiving method. The method is adapted to receive a bitstream in which moving pictures are coded and to decode the received bitstream, and comprises: receiving coded data obtained by packetizing the bitstream in which moving pictures are coded, by using inter prediction, in units of blocks obtained by partitioning each picture; reconstructing an original bitstream by processing packets of the coded data that has been received; deriving inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding; decoding a syntax element that indicates the number of the inter prediction information candidates from the bitstream that has been reconstructed so as to derive the number of the inter prediction information candidates; decoding an index that indicates an inter prediction information candidate to be used for inter prediction of the prediction block subject to decoding based on the number of the inter prediction information candidates derived by the first decoding from the bitstream that has been reconstructed; and selecting the inter prediction information candidate indicated by the index from the inter prediction information candidates derived by the deriving of the inter prediction information candidates.

Optional combinations of the aforementioned constituting elements and implementations of the invention in the form of methods, apparatuses, systems, recording mediums, and computer programs may also be practiced as additional modes of the present invention.

According to the present invention, the generated code size of coding information to be transmitted can be reduced, and coding efficiency can be improved.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 5 is a diagram explaining prediction blocks of spatial merge candidates in a merge mode;

FIG. 10 is a diagram explaining a bitstream syntax in units of prediction blocks that is related to the merge mode;

FIG. 11 is a diagram explaining an example of entropy codes of merge index syntax elements;

DETAILED DESCRIPTION OF THE INVENTION

The invention will now be described by reference to the preferred embodiments. This does not intend to limit the scope of the present invention, but to exemplify the invention.

The present embodiment relates to coding of moving pictures, and, more particularly, to deriving a plurality of motion vector predictors from motion vectors of blocks neighboring a block subject to coding or blocks of a coded picture, deriving a motion vector difference between the motion vector of the block subject to coding and a selected motion vector predictor, and coding the motion vector difference, for the purpose of improving the efficiency of coding moving pictures whereby a picture is partitioned into rectangular blocks of an arbitrary size and shape and motion compensation is performed between pictures in units of blocks. Alternatively, the code size is reduced by using coding information of blocks neighboring a block subject to coding or blocks of a coded picture and deriving coding information of the block subject to coding. In the case of decoding moving pictures, a plurality of motion vector predictors are derived from motion vectors of blocks neighboring a block subject to decoding or blocks of a decoded picture, and a motion vector of the block subject to decoding is derived from a vector difference decoded from a bitstream and a selected motion vector predictor. Alternatively, by using coding information of blocks neighboring a block subject to decoding or blocks of a decoded picture, and coding information of the block subject to decoding is derived.

First, technologies and technical terms used in the present embodiments are defined.

(Tree Block, Coding Block)

Figure 3:
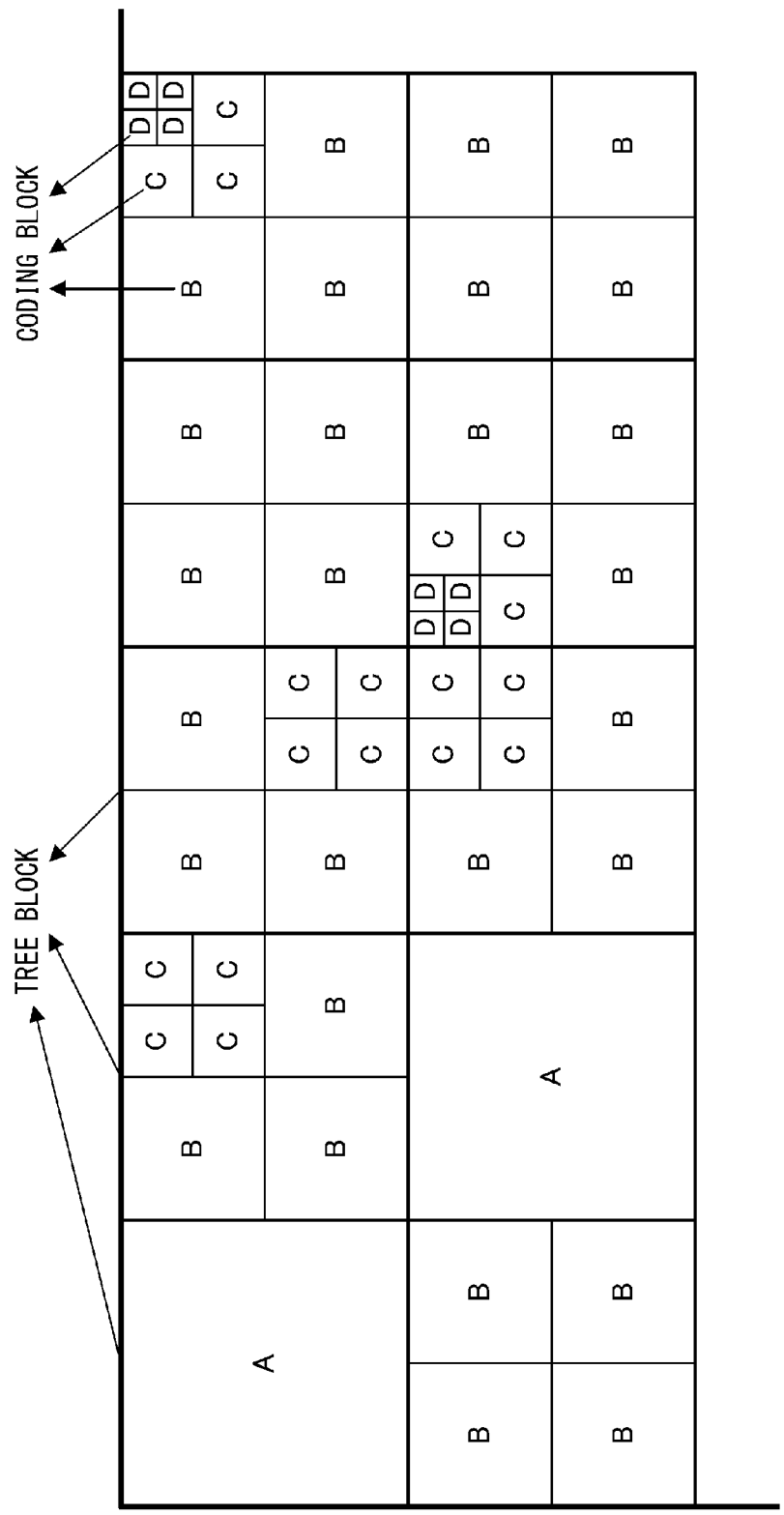
FIG. 3 is a diagram explaining a tree block and a coding block.
Figure 4D:
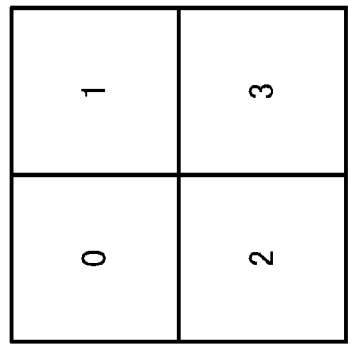
FIGS. 4A-4D are diagrams each explaining a partition mode of prediction blocks.
Figure 4C:
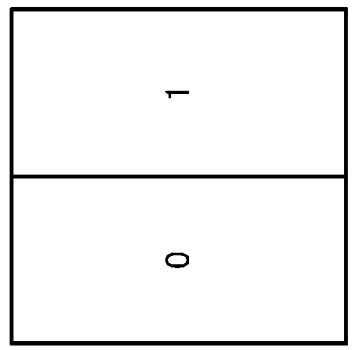
Figure 4B:
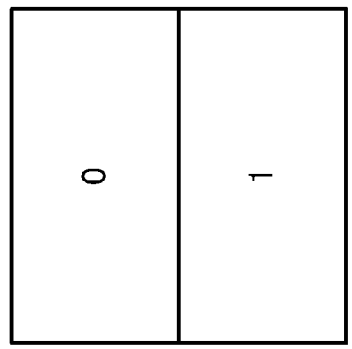
Figure 4A:
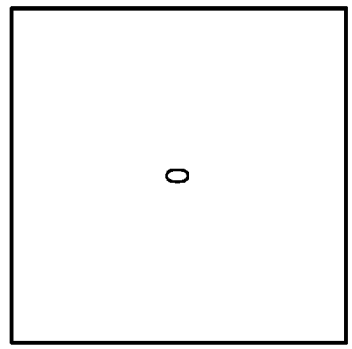

In the embodiments, a slice obtained by partitioning a picture into one or a plurality of slices is a basic coding unit, and a slice type, which is information indicating the type of a slice, is set for each slice. A slice is evenly partitioned into square-shaped units of equal sizes as shown in FIG. 3. The unit is defined as a tree block, which is a basic unit of address management for designating a block in a slice that is subject to coding or decoding (block subject to coding in the case of a coding process, and a block subject to decoding in the case of a decoding process and hereinafter used in this sense unless otherwise noted). A tree block is constituted by a single luminance signal and two color-difference signals except for monochrome. The size of a tree block can be freely set to be a size of a power of two according to a picture size or texture in a picture. Depending on the texture in the picture, a luminance signal and color-difference signals in a tree block can be hierarchically quartered (halved in a horizontal direction and halved in a vertical direction) as necessary to produce blocks of smaller block sizes so as to optimize a coding process. Each of these blocks will be referred to as a coding block, which is defined as a basic block in coding and decoding. A coding block is also constituted by a single luminance signal and two color-difference signals except for monochrome. The maximum size of a coding block is the same as the size of a tree block. A coding block having the smallest coding block size is referred to as a minimum coding block, and the size thereof can be freely set to be a size of a power of two.

In FIG. 3, a coding block A represents a single coding block obtained without partitioning a tree block. A coding block B represents a coding block obtained by quartering a tree block. A coding block C represents a coding block obtained by further quartering a block obtained by quartering a tree block. A coding block D represents a coding block obtained by further quartering a block, which is obtained by quartering a tree block, twice in a hierarchical manner and represents a coding block of the smallest size.

(Prediction Mode)

In units of coding blocks, switching is performed between intra prediction (MODE_INTRA) where prediction is performed from a decoded neighboring picture signal and inter prediction (MODE_INTER) where prediction is performed from an image signal of a decoded picture. A mode for identifying the intra prediction (MODE_INTRA) and the inter prediction (MODE_INTER) is defined as a prediction mode (PreMode). The prediction mode (PreMode) has the intra prediction (MODE_INTRA) or the inter prediction (MODE_INTER) as a value thereof and allows for coding by selection.

(Partition Mode, Prediction Block, Prediction Unit)

In the case of partitioning a picture into blocks and performing intra prediction (MODE_INTRA) and inter prediction (MODE_INTER), a coding block is partitioned as necessary in order to further reduce a unit used for switching between intra prediction and inter prediction so as to perform prediction. A mode for identifying a method of partitioning a luminance signal and color-difference signals of this coding block is defined as a partition mode (PartMode). Further, this partitioned block is defined as a prediction block. As shown in FIGS. 4A-4D, four types of partition modes (PartMode) are defined according to methods of partitioning a luminance signal of a coding block. A partition mode (PartMode) of a luminance signal of a coding block that remains non-partitioned and defined as a single prediction block (FIG. 4A) will be referred to as 2N×2N partitions (PART_2N×2N), a partition mode (PartMode) of horizontal partitioning of a luminance signal of a coding block to produce two prediction blocks (FIG. 4B) will be referred to as 2N×N partitions (PART_2N×N), a partition mode (PartMode) of vertical partitioning of a luminance signal of a coding block to produce two prediction blocks (FIG. 4C) will be referred to as N×2N partitions (PART_N×2N), and a partition mode (PartMode) of horizontal and vertical even partitioning of a luminance signal of a coding block to produce four prediction blocks (FIG. 4D) will be referred to as N×N partitions (PART_N×N). Except for N×N partitions (PART_N×N) of intra prediction (MODE_INTRA), color-difference signals are partitioned in the same way as horizontal and vertical partition ratios of a luminance signal for each partition mode (PartMode).

Numerals starting with 0 are assigned, in order of coding, to the prediction blocks in the coding block for the purpose of identifying the prediction blocks. The numeral is defined as a partition index PartIdx. The numerals entered to label the respective prediction blocks in the coding block of FIGS. 4A-4D denote partition indices PartIdx of the respective prediction blocks. In the 2N×N partitions (PART_2N×N) shown in FIG. 4B, a partition index PartIdx of the upper prediction block is set to be 0, and a partition index PartIdx of the lower prediction block is set to be 1. In the N×2N partitions (PART_N×2N) shown in FIG. 4C, a partition index PartIdx of the left prediction block is set to be 0, and a partition index PartIdx of the right prediction block is set to be 1. In the N×N partitions (PART_N×N) shown in FIG. 4D, a partition index PartIdx of the upper left prediction block is set to be 0, a partition index PartIdx of the upper right prediction block is set to be 1, a partition index PartIdx of the lower left prediction block is set to be 2, and a partition index PartIdx of the lower right prediction block is set to be 3.

When a prediction mode (PredMode) is inter prediction (MODE_INTER), a partition mode (PartMode) defines 2N×2N partitions (PART_2N×2N), 2N×N partitions (PART_2N×N), and N×2N partitions (PART_N×2N) in case of coding blocks other than a coding block D, which is the smallest coding block, and a partition mode (PartMode) defines N×N partitions (PART_N×N) in addition to 2N×2N partitions (PART_2N×2N), 2N×N partitions (PART_2N×N), and N×2N partitions (PART_N×2N) only for the coding block D, which is the smallest coding block. The reason why N×N partitions (PART_N×N) are not defined for coding blocks other than the smallest coding block is because small coding blocks can be expressed by quartering a coding block in case of coding blocks other than the smallest coding block.

(Positions of Tree Block, Coding Block, Prediction Block, Conversion Block)

Regarding the respective positions of blocks including a tree block, a coding block, a prediction block, and a conversion block according to the present embodiment, the position of the upper most and leftmost pixel of a luminance signal is set to be the origin (0,0) on a screen of the luminance signal, and the position of the upper most and leftmost pixel of the luminance signal of the area of each of the blocks is expressed by two-dimensional coordinates (x,y). Regarding the directions of coordinate axes, the right direction in the horizontal direction and the downward direction in the vertical direction are set to be positive directions, and a unit thereof is a single pixel unit of a luminance signal. In case of color-difference formats of 4:2:0 and 4:2:2 where a luminance signal and a color-difference signal have different picture sizes (pixel counts) as well as a case of a color-difference format of 4:4:4 where the luminance signal and the color-difference signal have the same picture size (pixel count), the position of each block of the color-difference signal is also expressed by the coordinates of a pixel of the luminance signal included in the area of the block, and a unit thereof is a single pixel of the luminance signal. This allows for the clarification of a relationship between the position of a block of the luminance signal and the position of a block of the color-difference signal only by comparing values of the coordinates, as well as the identification of the position of each block of the color-difference signal.

(Inter Prediction Mode, Prediction Mode)

In the embodiments of the present invention, a plurality of decoded pictures can be used as reference pictures in the inter prediction where prediction is performed from a picture signal of a decoded picture. In order to identify a reference picture selected from a plurality of reference pictures, a reference index is added for each prediction block. Two arbitrary reference pictures are selected for each prediction block so as to perform the inter prediction. Inter prediction modes include L0 prediction (Pred_L0), L1 prediction (Pred_1), and bi-prediction (Pred_BI). The reference pictures are managed by L0 (reference list 0) and L1 (reference list 1) each having a list structure, and the reference pictures can be identified by specifying an L0 or L1 reference index. The L0 prediction (Pred_L0) represents inter prediction where a reference picture managed by the L0 is referred to, and the L1 prediction (Pred_L1) represents inter prediction where a reference picture managed by the L1 is referred to. The bi-prediction (Pred_BI) represents inter prediction where both the L0 prediction and the L1 prediction are performed and where a single reference picture managed in each of the L0 and L1 is referred to. In inter prediction with a slice type of a P slice, only L0 prediction is available. In inter prediction with a slice type of a B slice, L0 prediction, L1 prediction, and bi-prediction (Pred_BI) in which the L0 prediction and the L1 prediction are averaged or added with weighting are available. It will be assumed in the processes described below that constants and variables with a suffix LX are output for each of L0 and L1.

(Merge Mode, Merge Candidate)

A merge mode does not code or decode inter prediction information such as a prediction mode, a reference index, a motion vector, etc., of the prediction block subject to coding or decoding. Instead, the merge mode is a mode where inter prediction is performed by deriving inter prediction information of the prediction block subject to coding or decoding from inter prediction information of one or more prediction blocks neighboring the prediction block subject to coding or decoding in the same picture as the prediction block subject to coding or decoding or a prediction block that exists at the same position as or near (in the neighborhood of) a prediction block subject to coding or decoding in a coded or decoded picture at a point of time different from the prediction block subject to coding or decoding. A spatial merge candidate represents a prediction block neighboring the prediction block subject to coding or decoding in the same picture as the prediction block subject to coding or decoding and inter prediction information of the prediction block. A temporal merge candidate represents a prediction block that exists at the same position as or near (in the neighborhood of) a prediction block subject to coding or decoding in a coded or decoded picture at a point of time different from the prediction block subject to coding or decoding and inter prediction information derived from the inter prediction information of the prediction block. Each of the merge candidates is added to a merge candidate list, and a merge candidate that is used for inter prediction is identified by a merge index.

(Neighboring Prediction Block)

FIGS. 5, 6, 7, and 8 are diagrams each explaining a prediction block neighboring a prediction block subject to coding or decoding in the same picture as the prediction block subject to coding or decoding. FIG. 9 is a diagram explaining a coded or decoded prediction block located at the same position as or near the prediction block subject to coding or decoding in a coded or decoded picture at a point of time different from the prediction block subject to coding or decoding. With reference to FIGS. 5, 6, 7, 8, and 9, an explanation will be given of a prediction block neighboring, in a spatial direction, the prediction block subject to coding or decoding and a prediction block at a different point of time that is located at the same position.

As shown in FIG. 5, a prediction block A neighboring the left side of the prediction block subject to coding or decoding in the same picture as the prediction block subject to coding or decoding, a prediction block B neighboring the upper side of the prediction block subject to coding or decoding, a prediction block C neighboring the upper right vertex of the prediction block subject to coding or decoding, a prediction block D neighboring the lower left vertex of the prediction block subject to coding or decoding, and a prediction block E neighboring the upper left vertex of the prediction block subject to coding or decoding will be defined as prediction blocks neighboring the prediction block subject to coding or decoding in a spatial direction.

Figure 6:
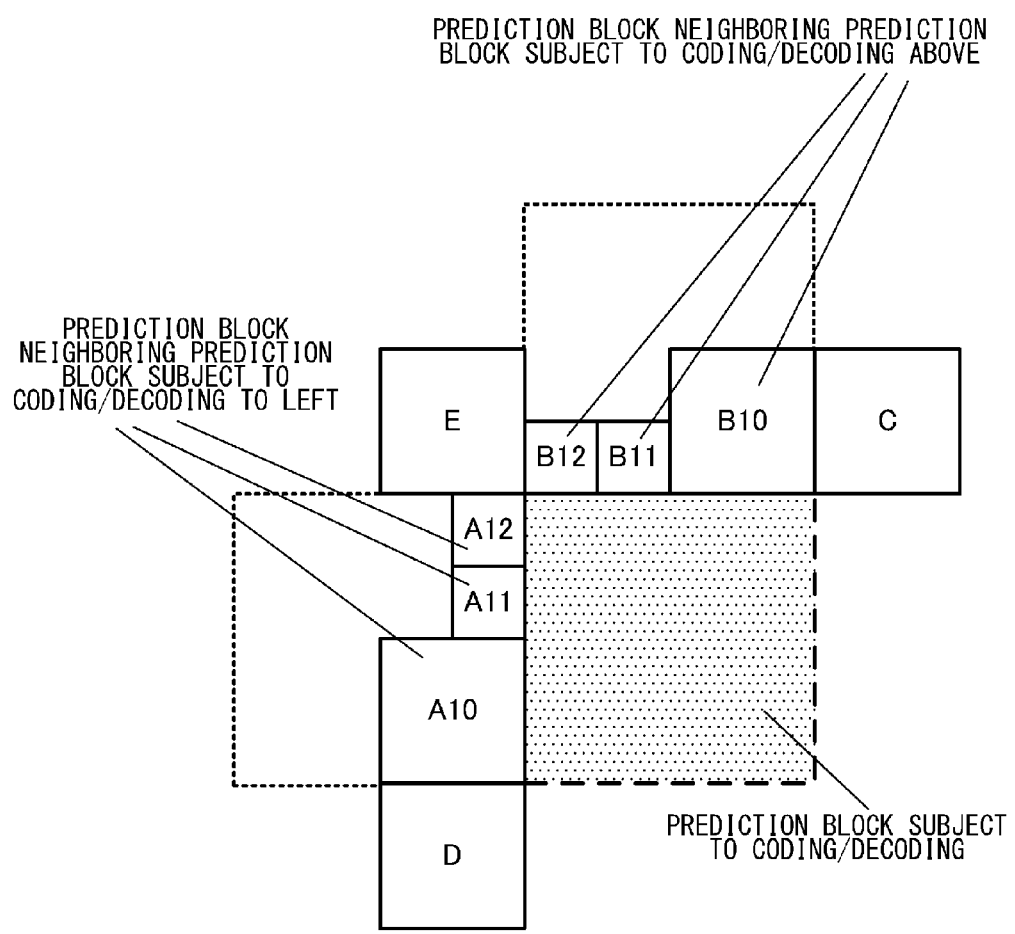
FIG. 6 is a diagram explaining prediction blocks of spatial merge candidates in a merge mode.

If, as shown in FIG. 6, the size of the prediction block neighboring the left side of the prediction block subject to coding or decoding is smaller than that of the prediction block subject to coding or decoding, and if there are a plurality of such blocks, only the lowermost prediction block A10 among prediction blocks neighboring the left side of the prediction block subject to coding or decoding is defined as the prediction block A neighboring the left side of the prediction block subject to coding or decoding in the present embodiment.

Similarly, the size of the prediction block neighboring the upper side of the prediction block subject to coding or decoding is smaller than that of the prediction block subject to coding or decoding, and if there are a plurality of such blocks, only the rightmost prediction block B10 among prediction blocks neighboring the upper side of the prediction block subject to coding or decoding is defined as the prediction block B neighboring the upper side of the prediction block subject to coding or decoding in the present embodiment.

Figure 7:
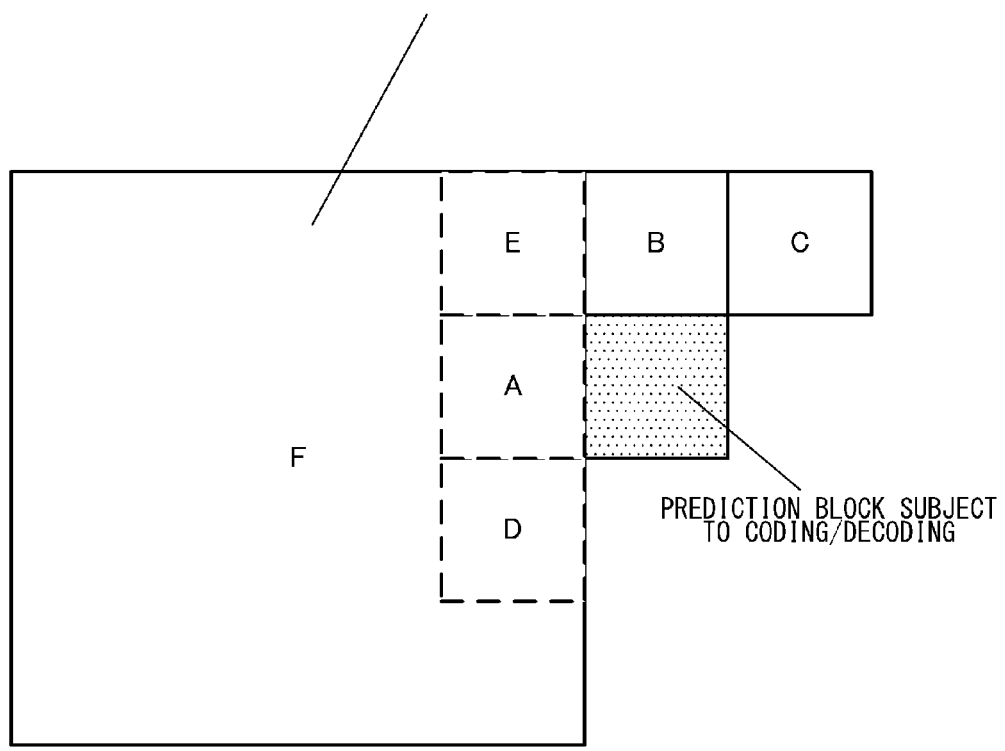
FIG. 7 is a diagram explaining prediction blocks of spatial merge candidates in a merge mode.

Even if, as shown in FIG. 7, the size of a prediction block F neighboring the prediction block subject to coding or decoding to the left is larger than that of the prediction block subject to coding or decoding, the aforementioned condition is observed. More specifically, the prediction block F neighboring to the left is defined as the prediction block A if the prediction block F neighbors the left side of the prediction block subject to coding or decoding, defined as the prediction block D if the prediction block F neighbors the lower left vertex of the prediction block subject to coding or decoding, and defined as the prediction block E if the prediction block F neighbors the upper left vertex of the prediction block subject to coding or decoding. In an example shown in FIG. 7, the prediction block A, the prediction block D, and the prediction block E represents the same prediction block.

Figure 8:
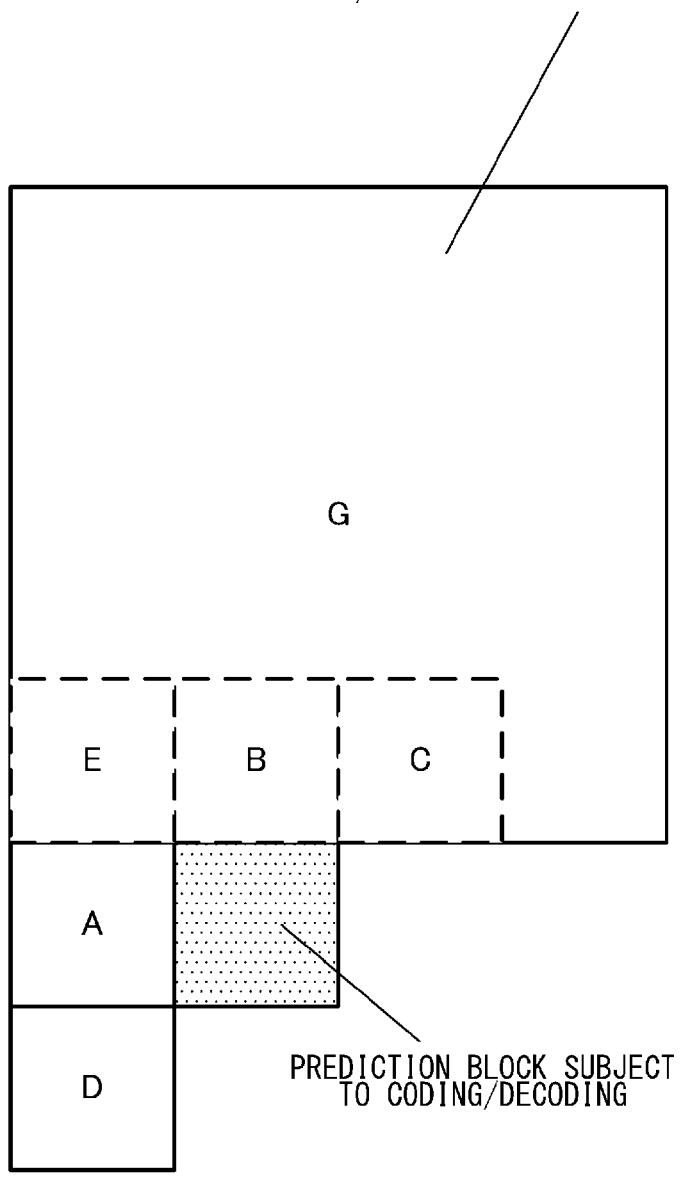
FIG. 8 is a diagram explaining prediction blocks of spatial merge candidates in a merge mode.
Figure 9:
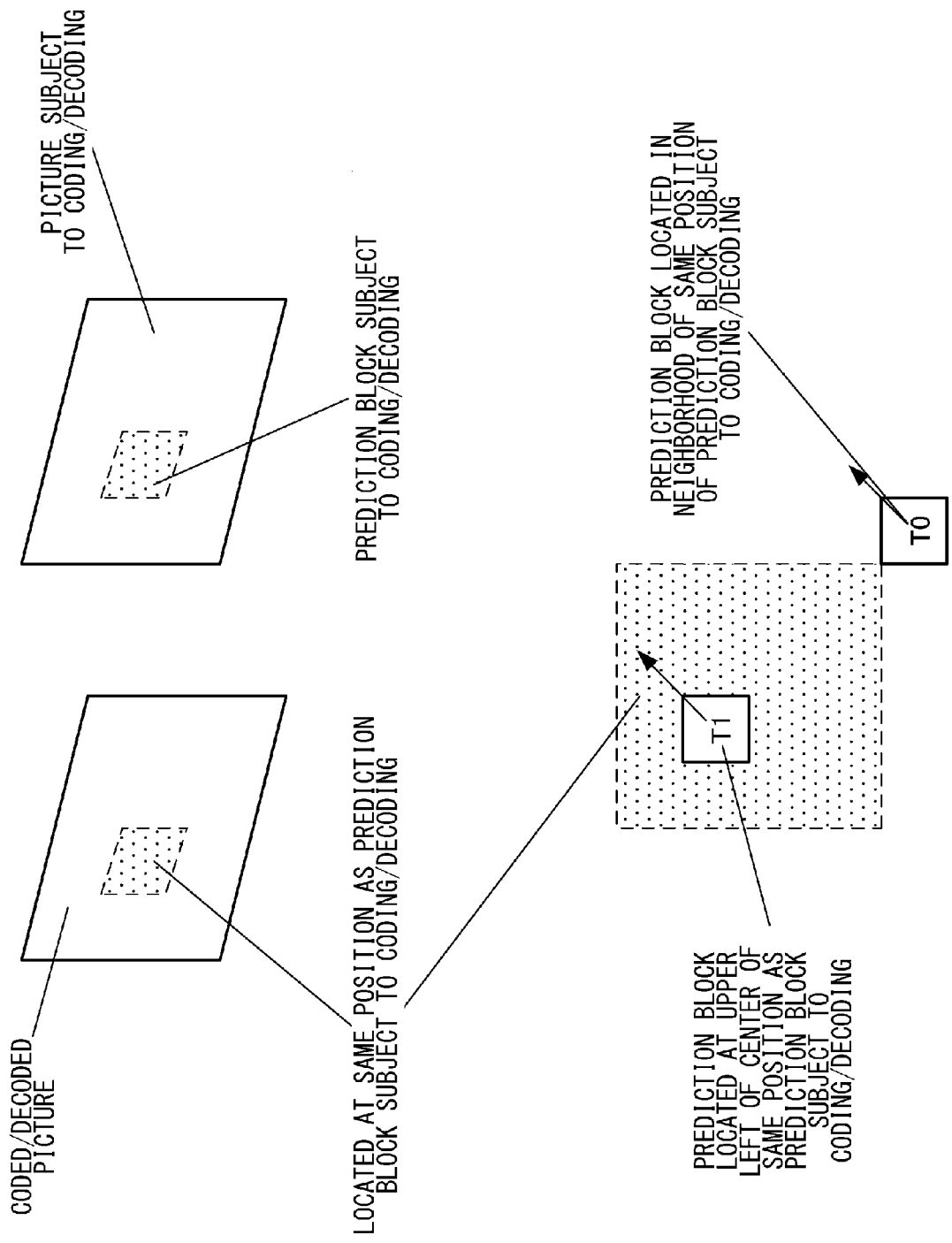
FIG. 9 is a diagram explaining prediction blocks of temporal merge candidates in a merge mode.

Even if, as shown in FIG. 8, the size of a prediction block G neighboring the prediction block subject to coding or decoding above is larger than that of the prediction block subject to coding or decoding, the aforementioned condition is observed. More specifically, the prediction block G neighboring above is defined as the prediction block B if the prediction block G neighboring above neighbors the upper side of the prediction block subject to coding or decoding, defined as the prediction block C if the prediction block G neighbors the upper right vertex of the prediction block subject to coding or decoding, and defined as the prediction block E if the prediction block G neighbors the upper left vertex of the prediction block subject to coding or decoding. In an example shown in FIG. 8, the prediction block B, the prediction block C, and the prediction block E represents the same prediction block.

As shown in FIG. 9, in a coded or decoded picture at a point of time different from the prediction block subject to coding or decoding, coded or decoded prediction blocks T0 and T1 located at the same position as or near the prediction block subject to coding or decoding will be defined as prediction blocks that are located at a different point of time and are located at the same position.

(POC)

POC is a variable mapped to a coded picture. A value incremented by 1 at a time in an output sequence of a picture is set in POC. A POC value allows for decision as to whether pictures are identical, decision of anteroposterior relationship between pictures in an output sequence, or derivation of a distance between pictures. For example, two pictures are determined to be identical to each other if they have the same POC value. If two pictures have different POC values, the one with a smaller POC value is determined to be output first. The difference in POC between two pictures indicates an inter-picture distance in the time axis direction.

Figure 1:
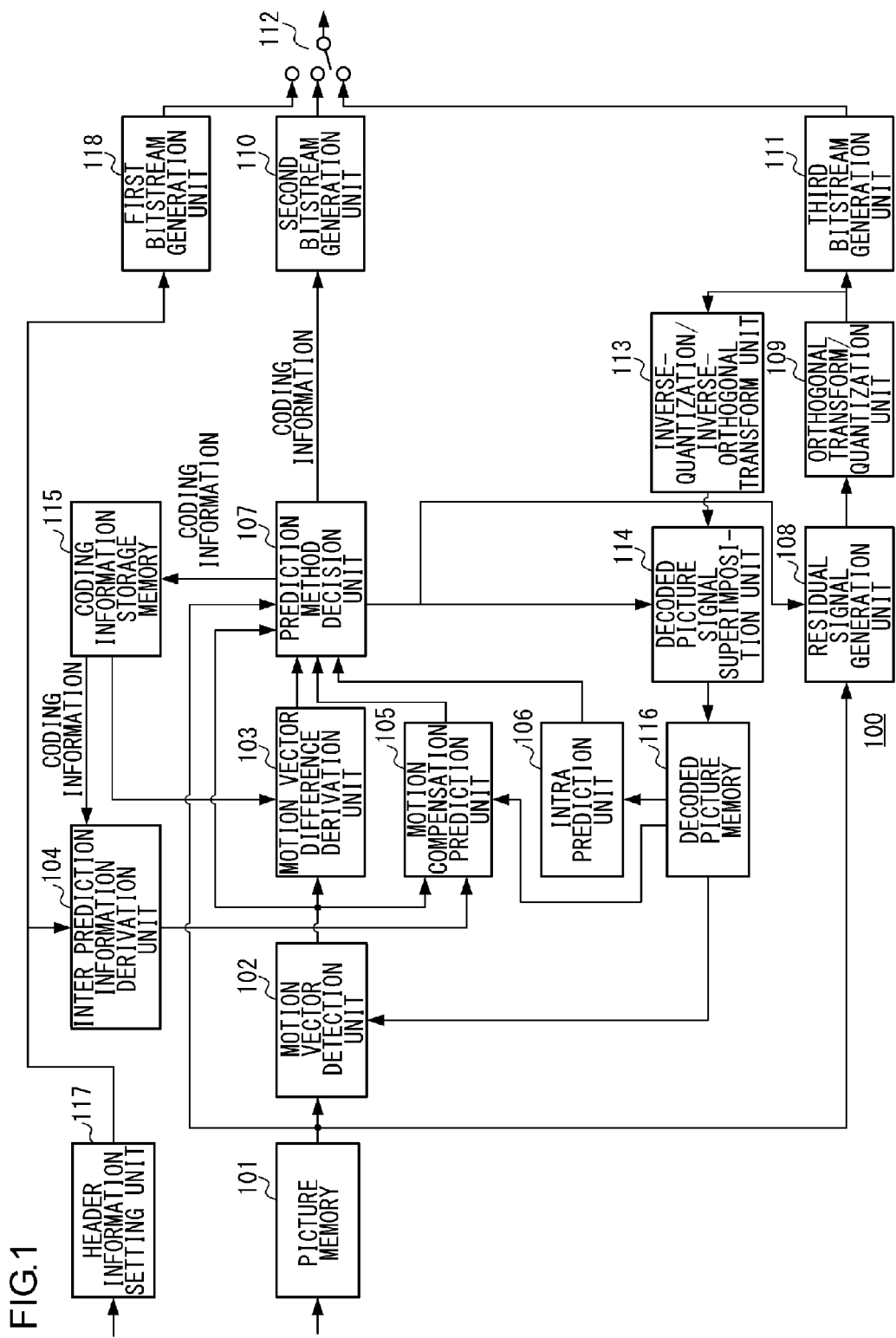
FIG. 1 is a block diagram showing the configuration of a moving picture coding device for performing a method of predicting a motion vector according to an embodiment of the present invention.

A description will be given of embodiments of the present invention with reference to the drawings. FIG. 1 is a block diagram showing the configuration of a moving picture coding device according to an embodiment of the present invention. The moving picture coding device according to the embodiment includes a picture memory 101, a header information setting unit 117, a motion vector detection unit 102, a motion vector difference derivation unit 103, an inter prediction information derivation unit 104, a motion compensation prediction unit 105, an intra prediction unit 106, a prediction method decision unit 107, an residual signal generation unit 108, an orthogonal transform/quantization unit 109, a first bit stream generation unit 118, a second bitstream generation unit 110, a third bitstream generation unit 111, a multiplexing unit 112, an inverse-quantization/inverse-orthogonal transform unit 113, a decoded picture signal superimposition unit 114, a coding information storage memory 115, and a decoded picture memory 116.

The header information setting unit 117 sets information defined for each sequence, picture, or slice. The information defined for each sequence, picture, or slice that has been set is supplied to all blocks (not shown) as well as the inter prediction information derivation unit 104 and the first bitstream generation unit 118.

The picture memory 101 temporarily stores an picture signal of a picture subject to coding supplied in the order of image/display time. The picture memory 101 supplies, in predetermined units of pixel blocks, the stored picture signal of the picture subject to coding to the motion vector detection unit 102, the prediction method decision unit 107, and the residual signal generation unit 108. In this process, picture signals of the picture stored in the order of image/display time are rearranged in the order of coding and output from the picture memory 101 in units of pixel blocks.

The motion vector detection unit 102 detects respective motion vectors according to a prediction block size and a prediction mode for each prediction block by subjecting the picture signal supplied from the picture memory 101 and a reference picture supplied from the decoded picture memory 116 to block matching or the like. The motion vector detection unit 102 supplies the detected motion vectors to the motion compensation prediction unit 105, the motion vector difference derivation unit 103, and the prediction method decision unit 107.

The motion vector difference derivation unit 103 derives a plurality of motion vector predictor candidates by using coding information in the coded picture signal stored in the coding information storage memory 115 and adds the plurality of motion vector predictor candidates in a motion vector predictor list. The motion vector difference derivation unit 103 selects the optimum motion vector predictor from the plurality of motion vector predictor candidates added in the motion vector predictor list, derives a motion vector difference from the motion vector detected by the motion vector detection unit 102 and the motion vector predictor, and supplies the derived motion vector difference to the prediction method decision unit 107. Further, the motion vector difference derivation unit 103 supplies a motion vector predictor index identifying the motion vector predictor selected from the motion vector predictor candidates added in the motion vector predictor list to the prediction method decision unit 107.

The inter prediction information derivation unit 104 derives a merge candidate in a merge mode. The inter prediction information derivation unit 104 derives a plurality of merge candidates by using coding information of coded prediction blocks stored in the coding information storage memory 115, adds the candidates in a merge candidate list described later, and selects an appropriate merge candidate from the plurality of merge candidates added to the merge candidate list. The inter prediction information derivation unit 104 supplies, to the motion compensation prediction unit 105, inter prediction information including flags predFlagL0[xP][yP] and predFlagL1[xP][yP] indicating whether L0 prediction and L1 prediction are to be used, respectively, reference indices refIdxL0[xP][yP] and refIdxL1[xP][yP], motion vectors mvL0 [xP] [yP] and mvL1[xP] [yP], etc., of each prediction block of the selected merge candidate, and supplies a merge index identifying the selected merge candidate to the prediction method decision unit 107. xP and yP are indices indicating the position of the top left pixel in the prediction block in the picture. The detailed configuration and operation of the inter prediction information derivation unit 104 will be described later.

The motion compensation prediction unit 105 uses the motion vector detected by the motion vector detection unit 102 and the inter prediction information derivation unit 104 to generate a predicted picture signal from the reference picture by inter prediction (motion compensation prediction). The motion compensation prediction unit 105 supplies the predicted picture signal to the prediction method decision unit 107. In L0 prediction and in L1 prediction, the motion compensation prediction unit 105 performs unidirectional prediction. In the case of bi-prediction (Pred_BI), bi-directional prediction is performed. Respective inter prediction signals from L0 prediction and L1 prediction are adaptively multiplied by respective weighting factors, and offset values are added to the respective results of the multiplication. The resultant signals are superimposed on each other to produce an ultimate prediction picture signal.

The intra prediction unit 106 performs intra prediction for each intra prediction mode. The intra prediction unit 106 generates a prediction picture signal by intra prediction from a coded picture signal that is stored in the decoded picture memory 116, selects an appropriate intra prediction mode from among a plurality of intra prediction modes, and supplies to the prediction method decision unit 107 an intra prediction mode that has been selected and a prediction picture signal dependent on the selected intra prediction mode.

The prediction method decision unit 107 determines a prediction mode PredMode indicating whether inter prediction (PRED_INTER) or intra prediction (PRED_INTRA) is used in units of optimum coding blocks and a partition mode PartMode from a plurality of prediction methods, by evaluating the code size of the coding information and the coding size of a residual signal, the amount of distortion between the prediction picture signal and the picture signal, etc. The prediction method decision unit 107 determines whether the merge mode is used in units of prediction blocks in the inter prediction (PRED_INTER), determines the merge index in the case of the merge mode and the inter prediction mode, the motion vector predictor index, the L0 and L1 reference indices, the motion vector difference, and the like, and supplies coding information depending on the decisions to the second bitstream generation unit 110.

Further, the prediction method decision unit 107 stores, in the coding information storage memory 115, coding information including information indicating the determined prediction method and including a motion vector dependent on the determined prediction method. The coding information that is stored in this case includes a prediction mode PreMode of each coding block, a partition mode PartMode, flags predFlagL0[xP] [yP] and predFlagL1[xP][yP] of each prediction block respectively indicating whether L0 prediction and L1 prediction are to be used, L0 and L1 reference indices refIdxL0[xP] [yP] and refIdxL1[xP] [yP], L0 and L1 motion vectors mvL0 [xP] [yP] and mvL1[xP][yP], etc. xP and yP are indices indicating the position of the top left pixel in the prediction block in the picture. If the prediction mode PredMode is inter prediction (MODE_INTER), the flag predFlagL0[xP] [yP] indicating whether L0 prediction is to be used and the flag predFlagL1[xP] [yP] indicating whether L1 prediction is to be used are both 0. On the other hand, if the prediction mode PredMode is inter prediction (MODE_INTER) and the inter prediction mode is L0 prediction (Pred_L0), the flag predFlagL0[xP] [yP] indicating whether L0 prediction is to be used is 1, and the flag predFlagL1 [xP][yP] indicating whether L1 prediction is to be used is 0. If the inter prediction mode is L1 prediction (Pred_L1), the flag predFlagL0[xP] [yP] indicating whether L0 prediction is to be used is 0, and the flag predFlagL1[xP] [yP] indicating whether L1 prediction is to be used is 1. If the inter prediction mode is bi-prediction (Pred_BI), the flag predFlagL0[xP] [yP] indicating whether L0 prediction is to be used and the flag predFlagL1[xP] [yP] indicating whether L1 prediction is to be used are both 1. The prediction method decision unit 107 supplies a prediction picture signal dependent on the determined prediction mode to the residual signal generation unit 108 and the decoded picture signal superimposition unit 114.

The residual signal generation unit 108 generates a residual signal by subtracting the prediction picture signal from the picture signal subject to coding and supplies the residual signal to the orthogonal transform/quantization unit 109. The orthogonal transform/quantization unit 109 subjects the residual signal to orthogonal transform and quantization in accordance with a quantization parameter so as to generate an orthogonally transformed, quantized residual signal. The orthogonal transform/quantization unit 109 supplies the residual signal to the third bitstream generation unit 111 and the inverse-quantization/inverse-orthogonal transform unit 113. Further, the orthogonal transform/quantization unit 109 stores the quantization parameter in the coding information storage memory 115.

The first bitstream generation unit 118 codes information defined for each sequence, picture, or slice that has been set by the header information setting unit 117. The first bitstream generation unit 118 generates a first bitstream and supplies the first bitstream to the multiplexing unit 112.

The second bitstream generation unit 110 codes coding information dependent on the prediction method determined by the prediction method decision unit 107 for each coding block and for each prediction block. More specifically, the second bitstream generation unit 110 generates a second bitstream by coding, in accordance with a predefined syntax rule described later, coding information such as information related to a flag indicating whether the merge mode is used in the case of a prediction mode PredMode for each coding block, a partition mode PartMode, and inter prediction (PRED_INTER), a merge index in the case of the merge mode, an inter prediction mode, a motion vector predictor index, and a motion vector difference in the case that the merge mode is not used. The second bitstream generation unit 110 supplies the second bitstream to the multiplexing unit 112.

The third bitstream generation unit 111 subjects an orthogonally transformed and quantized residual signal to entropy coding according to a predefined syntax rule so as to generate a third bitstream and supplies the third bitstream to the multiplexing unit 112. The multiplexing unit 112 multiplexes the first bitstream, the second bitstream, and the third bitstream according to a predefined syntax rule and outputs the resultant bitstream.

The inverse-quantization/inverse-orthogonal transform unit 113 subjects the orthogonally transformed and quantized residual signal supplied from the orthogonal transform/quantization unit 109 to inverse-quantization and inverse-orthogonal transform so as to derive the residual signal and supplies the residual signal to the decoded picture signal superimposition unit 114. The decoded picture signal superimposition unit 114 superimposes the prediction picture signal dependent on the decision by the prediction method decision unit 107 and the residual signal subjected to inverse-quantization and inverse-orthogonal transform by the inverse-quantization/inverse-orthogonal transform unit 113 one upon the other so as to generate a decoded picture. The decoded picture signal superimposition unit 114 stores the decoded picture in the decoded picture memory 116. The decoded picture may be subject to filtering for reducing distortion such as block distortion and the like resulting from coding before being stored in the decoded picture memory 116.

Figure 2:
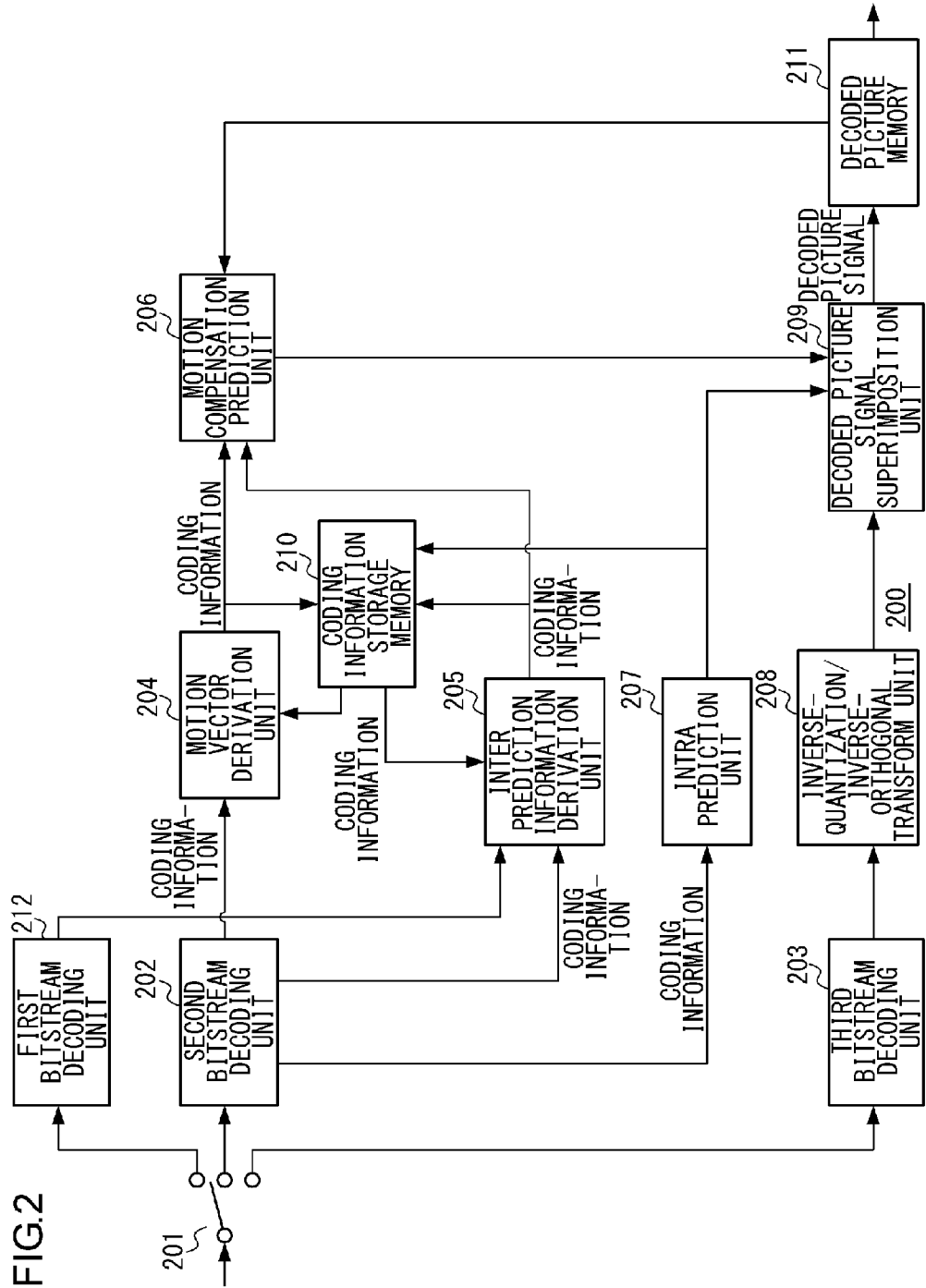
FIG. 2 is a block diagram showing the configuration of a moving picture decoding device for performing a method of predicting a motion vector according to an embodiment.

FIG. 2 is a block diagram showing the configuration of a moving picture decoding device according to the embodiment of the present invention corresponding to the moving picture coding device of FIG. 1. The moving picture decoding device according to the embodiment includes a demultiplexing unit 201, a first bitstream decoding unit 212, a second bitstream decoding unit 202, a third bitstream decoding unit 203, a motion vector derivation unit 204, an inter prediction information derivation unit 205, a motion compensation prediction unit 206, an intra prediction unit 207, an inverse-quantization/inverse-orthogonal transform unit 208, a decoded picture signal superimposition unit 209, a coding information storage memory 210, and a decoded picture memory 211.

The decoding process of the moving picture decoding device of FIG. 2 corresponds to the decoding process provided in the moving picture coding device of FIG. 1. Therefore, the motion compensation prediction unit 206, the inverse-quantization/inverse-orthogonal transform unit 208, the decoded picture signal superimposition unit 209, the coding information storage memory 210, and the decoded picture memory 211 of FIG. 2 have the same functions as the motion compensation prediction unit 105, the inverse-quantization/inverse-orthogonal transform unit 113, the decoded picture signal superimposition unit 114, the coding information storage memory 115, and the decoded picture memory 116 of the moving picture coding device of FIG. 1, respectively.

A bitstream supplied to the demultiplexing unit 201 is demultiplexed according to a predefined syntax rule. The bitstream resulting from demultiplexing is supplied to the first bitstream decoding unit 212, the second bitstream decoding unit 202, and the third bitstream decoding unit 203.

The first bitstream decoding unit 212 decodes the supplied bitstream so as to obtain information defined for each sequence, picture, or slice. The information defined for each sequence, picture, or slice that has been obtained is supplied to all blocks (not shown).

The second bitstream decoding unit 202 decodes the supplied bitstream so as to obtain information defined for each coding block and coding information defined for each prediction block. More specifically, the second bitstream decoding unit 202 decodes, in accordance with a predefined syntax rule described later, coding information related to a flag indicating whether the merge mode is used in the case of a prediction mode PredMode indicating whether inter prediction (PRED_INTER) or intra prediction (PRED_IN- TRA) is used in units of coding blocks, a partition mode PartMode, and inter prediction (PRED_INTER), a merge index in the case of the merge mode, an inter prediction mode, a motion vector predictor index, a motion vector difference, and the like in the case that the merge mode is not used. The second bitstream decoding unit 202 supplies the coding information to the motion vector derivation unit 204, the inter prediction information derivation unit 205, or the intra prediction unit 207.

The third bitstream decoding unit 203 decodes the supplied bitstream to derive an orthogonally transformed and quantized residual signal. The third bitstream decoding unit 203 then supplies the orthogonally transformed and quantized residual signal to the inverse-quantization/inverse-orthogonal transform unit 208.

In the case that the prediction mode PredMode of the prediction block subject to decoding is not the merge mode in inter prediction (PRED_INTER), the motion vector derivation unit 204 uses the coding information of the decoded picture signal stored in the coding information storage memory 210 to derive a plurality of motion vector predictor candidates and adds the candidates in the motion vector predictor list described later. The motion vector derivation unit 204 selects a motion vector predictor in accordance with the motion vector predictor index decoded by the second bitstream decoding unit 202 and supplied therefrom. The motion vector derivation unit 204 derives a motion vector from a vector difference decoded by the second bitstream decoding unit 202 and from the selected motion vector predictor. Along with other coding information, the motion vector derivation unit 204 supplies the derived motion vector to the motion compensation prediction unit 206 and stores the derived motion vector in the coding information storage memory 210. The coding information of the prediction block that is supplied and stored in this case includes a prediction mode PreMode, a partition mode PartMode, flags predFlagL0[xP][yP] and predFlagL1[xP][yP] respectively indicating whether L0 prediction and L1 prediction are to be used, L0 and L1 reference indices refIdxL0[xP] [yP] and refIdxL1[xP] [yP], L0 and L1 motion vectors mvL0 [xP] [yP] and mvL1[xP][yP], etc. xP and yP are indices indicating the position of the top left pixel in the prediction block in the picture. If the prediction mode PredMode is inter prediction (MODE_INTER) and the inter prediction mode is L0 prediction (Pred_L0), a flag predFlagL0 indicating whether L0 prediction is to be used is 1, and a flag predFlagL1 indicating whether L1 prediction is to be used is 0. If the inter prediction mode is L1 prediction (Pred_L1), the flag predFlagL0 indicating whether L0 prediction is to be used is 0, and the flag predFlagL1 indicating whether L1 prediction is to be used is 1. If the inter prediction mode is bi-prediction (Pred_BI), the flag predFlagL0 indicating whether L0 prediction is to be used and the flag predFlagL1 indicating whether L1 prediction is to be used are both 1.

In the case that the prediction mode PredMode of the prediction block subject to decoding is the merge mode in inter prediction (PRED_INTER), the inter prediction information derivation unit 205 derives a merge candidate. The inter prediction information derivation unit 205 derives a plurality of merge candidates by using coding information of decoded prediction blocks stored in the coding information storage memory 115, adds the candidates in a merge candidate list described later, and selects, from the plurality of merge candidates added to the merge candidate list, a merge candidate that corresponds to a merge index decoded by the second bitstream decoding unit 202 and supplied therefrom. The inter prediction information derivation unit 205 supplies, to the motion compensation prediction unit 206, inter prediction information including flags predFlagL0[xP][yP] and predFlagL1[xP][yP] respectively indicating whether L0 prediction and L1 prediction are to be used, L0 and L1 reference indices refIdxL0[xP] [yP] and refIdxL1[xP][yP], L0 and L1 motion vectors mvL0[xP][yP] and mvL1[xP] [yP], etc., of the selected merge candidate, and stores the inter prediction information in the coding information storage memory 210. xP and yP are indices indicating the position of the top left pixel in the prediction block in the picture. The detailed configuration and operation of the inter prediction information derivation unit 205 will be described later.

The motion compensation prediction unit 206 uses the inter prediction information derived by the motion vector derivation unit 204 or the inter prediction information derivation unit 205 to generate a predicted picture signal from the reference picture stored in the decoded picture memory 211 by inter prediction (motion compensation prediction). The motion compensation prediction unit 206 supplies the predicted picture signal to the decoded picture signal superimposition unit 209. In the case of bi-prediction (Pred_BI), two motion compensated predicted picture signals from L0 prediction and L1 prediction are adaptively multiplied by weight factors, and the resultant signals are superimposed so as to generate an ultimate predicted picture signal.

In the case that the prediction mode PredMode of the prediction block subject to decoding is intra prediction (PRED_INTRA), the intra prediction unit 207 performs intra prediction. The coding information decoded by the first bitstream decoding unit includes an intra prediction mode. In accordance with the intra prediction mode, the intra prediction unit 207 generates a predicted picture signal from the decoded picture signal stored in the decoded picture memory 211 by intra prediction and supplies the predicted picture signal to the decoded picture signal superimposition unit 209. The intra prediction unit 207 sets both the flags predFlagL0[xP][yP] and predFlagL1[xP][yP] respectively indicating whether L0 prediction and L1 prediction are to be used to be 0 and stores the flags in the coding information storage memory 210. xP and yP are indices indicating the position of the top left pixel in the prediction block in the picture.

The inverse-quantization/inverse-orthogonal transform unit 208 subjects an orthogonally transformed and quantized residual signal decoded by the second bitstream decoding unit 202 to inverse-quantization and inverse-orthogonal transform so as to obtain an inverse-orthogonally transformed and inverse-quantized residual signal.

The decoded picture signal superimposition unit 209 superimposes the predicted picture signal subjected to inter prediction by the motion compensation prediction unit 206 or the predicted picture signal subjected to intra prediction by the intra prediction unit 207 and the residual signal subjected to inverse-quantization and inverse-orthogonal transform by the inverse-quantization/inverse-orthogonal transform unit 208 one upon the other so as to decode a decoded picture signal. The decoded picture signal superimposition unit 209 then stores the decoded picture signal in the decoded picture memory 211. In storing the decoded picture signal, the decoded picture may be subject to filtering for reducing, for example, block distortion resulting from coding before being stored in the decoded picture memory 211.

An explanation will now be given of syntax, which is a rule common to coding and decoding of a bitstream of moving pictures coded by a moving picture coding device provided with the motion vector prediction method according to the embodiment and decoded by a decoding device.

FIG. 10 shows a syntax rule defined for each prediction block. If the value of the prediction mode PredMode of a prediction block is inter prediction (MODE_INTER), a flag merge_flag[x0] [y0] indicating whether the merge mode is used is set. x0 and y0 are indices indicating the position of the top left pixel in the prediction block in the picture produced by luminance signals. merge_flag[x0] [y0] is a flag defined to indicate whether the merge mode is used in the prediction block located at (x0, y0) in the picture.

If merge_flag[x0] [y0] is 1, it means that the merge mode is used. A syntax element merge_idx[x0] [y0], which denotes an index in a merge list (a list of merge candidates referred to), is set. x0 and y0 are indices indicating the position of the top left pixel in the prediction block in the picture. merge_idx[x0] [y0] is a merge index for the prediction block located at (x0, y0) in the picture. In the case of entropy coding or decoding the merge index, the coding and decoding can be performed with a smaller code size and smaller processing volume as the number of the merge candidates becomes smaller. FIG. 11 shows an example of an entropy code of merge index syntax element merge_idx [x0] [y0]. If the number of the merge candidates is 3, the merge index becomes 0, 1, or 2 by setting the maximum merge index value to be (the number of the merge candidates−1), i.e., 2, and the code for the merge index syntax element merge_idx[x0] [y0] becomes "0," "10," or "11," respectively. If the number of the merge candidates is 4, the merge index becomes 0, 1, 2, or 3 by setting the maximum merge index value to be (the maximum number of the merge candidates−1), i.e., 3, and the code for the merge index syntax element merge_idx[x0] [y0] becomes"0," "10," "110," or"111," respectively. If the number of the merge candidates is 5, the merge index becomes 0, 1, 2, 3, or 4 by setting the maximum merge index value to be (the maximum number of the merge candidates−1), i.e., 4, and the code for the merge index syntax element merge_idx[x0] [y0] becomes "0," "10," "110," "1110," or "1111," respectively, at this time. For example, if the merge index is 2, the code becomes "11" when the number of the merge candidates is 3 and "110" when the number of the merge candidates is 4 or 5. In other words, in the case where the maximum number of the merge candidates can be limited, the merge index can be expressed with a short code length by limiting the maximum merge index value to be (the number of the merge candidates−1). That is, in the case of limiting the number of the merge candidates, limiting the maximum merge index value to be (the number of the merge candidates−1) allows for the merge index to be expressed in a small code size. In the present exemplary embodiment, the code size is reduced by changing the value of the merge index according to the number of the merge candidates as shown in FIG. 11.

Meanwhile, if merge_flag[x0] [y0] is 0, it means that the merge mode is not used. In the case that the slice type is a B slice, a syntax element inter_pred_flag[x0] [y0] for discriminating between different inter prediction modes is set, and the syntax element is used to discriminate L0 prediction (Pred_L0), L1 prediction (Pred_1), and bi-prediction (Pred_BI) from one another. For each L0 and for each L1, syntax elements ref_idx_l0[x0] [y0] and ref_idx_l1[x0] [y0], each of which denotes a reference index for identifying a reference picture, and syntax elements mvd_l0[x0] [y0] [j] and mvd_l1[x0] [y0] [j], each of which denotes a motion vector difference between a motion vector for a prediction block determined through motion vector detection and a motion vector predictor, are set, respectively. x0 and y0 are indices indicating the position of the top left pixel in the prediction block in the picture. ref_idx_l0[x0] [y0] and mvd_l0[x0] [y0] [j] represent an L0 reference index and a motion vector difference for the prediction block located at (x0, y0) in the picture, respectively. ref_idx_l1[x0] [y0] and mvd_l1[x0] [y0] [j] represent an L1 reference index and a motion vector difference for the prediction block located at (x0, y0) in the picture, respectively. j indicates a component of the motion vector difference, j=0 indicating an x component, and j=1 indicating a y component. Syntax elements mvp_idx_l0[x0] [y0] and mvp_idx_l1[x0] [y0], each of which denotes an index in a motion vector predictor list (a list of motion vector predictor candidates referred to), are set. x0 and y0 are indices indicating the position of the top left pixel in the prediction block in the picture. mvp_idx_l0 [x0] [y0] and mvp_idx_l1[x0] [y0] are L0 and L1 motion vector predictor indices for the prediction block located at (x0, y0) in the picture, respectively. In the embodiments of the present invention, the value of the number of these candidates is set to be 2.

An inter prediction information derivation method according to an embodiment is performed in the inter prediction information derivation unit 104 of the moving picture coding device of FIG. 1 and in the inter prediction information derivation unit 205 of the moving picture decoding device of FIG. 2.

The inter prediction information derivation method according to the embodiment is executed in units of prediction blocks building a coding block. The method is performed both in a coding process and in a decoding process. In the case of the merge mode while the prediction mode PredMode of a prediction block is inter prediction (MODE_INTER), the method is performed when deriving the prediction mode, the reference index, and the motion vector of a prediction block subject to coding by using the prediction mode, the reference index, and the motion vector of a coded prediction block in the case f coding, and the method is performed when deriving the prediction mode, the reference index, and the motion vector of a prediction block subject to decoding by using the prediction mode, the reference index, and the motion vector of a decoded prediction block in the case f decoding.

In the merge mode, prediction blocks including a prediction block Col (one of T0 and T1) described with reference to FIG. 9 as being located at the same position as or near the target prediction block at a different point of time as well as including the prediction block A neighboring to the left, the prediction block B neighboring above, the prediction block C neighboring at top right, the prediction block D neighboring at bottom left, and the prediction block E neighboring at top left, which are explained using FIGS. 5, 6, 7, and 8, are defined as candidates. The inter prediction information derivation unit 104 of the moving picture coding device and the inter prediction information derivation unit 205 of the moving picture decoding device add these candidates in the merge candidate list according to the order commonly defined on the coding side and on the decoding side. The inter prediction information derivation unit 104 of the moving picture coding device determines a merge index that identifies an element in the merge candidate list and codes the merge index via the second bitstream generation unit 110. The inter prediction information derivation unit 205 of the moving picture decoding device is supplied with a merge index decoded by the second bitstream decoding unit 202, selects the prediction block determined by the merge index from the merge candidate list, and performs motion compensation prediction using the inter prediction information such as the prediction mode, the reference index, the motion vector, etc., of the selected merge candidate.

The final number of merge candidates finalNumMergeCand, which is added to the merge candidate list mergeCandList in units of slices, is set. In the present embodiment, the final number of merge candidates finalNumMergeCand is set to be smaller than the latter one if the slice type is a P slice, and the final number of merge candidates finalNumMergeCand is set to be larger than the former one if the slice type is a B slice. The final number of merge candidates finalNumMergeCand is set to be 3 if the slice type is a P slice, and the final number of merge candidates finalNumMergeCand is set to be 5 if the slice type is a B slice.

Figure 12:
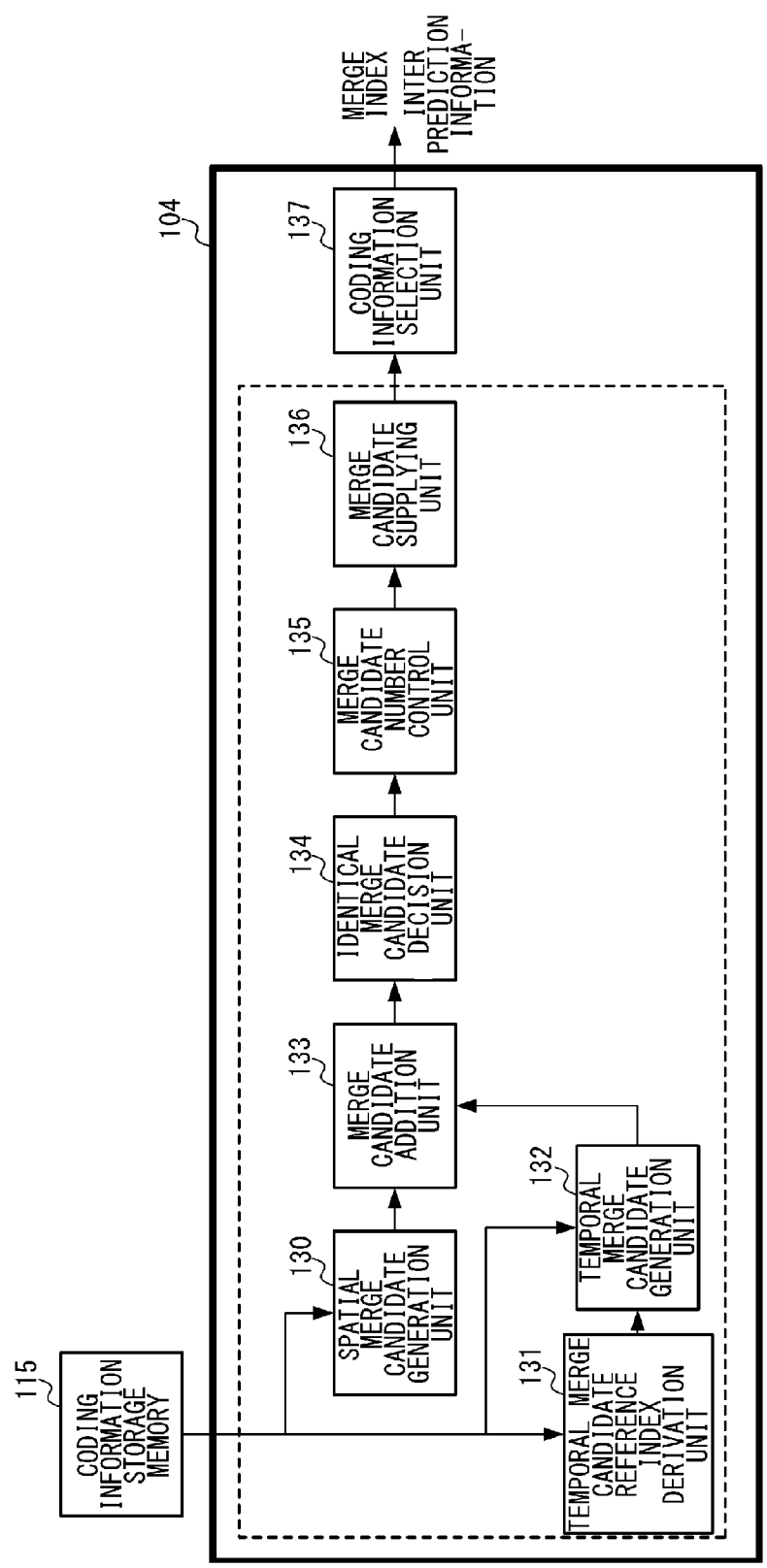
FIG. 12 is a block diagram showing the detailed configuration of an inter prediction information derivation unit of the moving picture coding device of FIG. 1.
Figure 13:
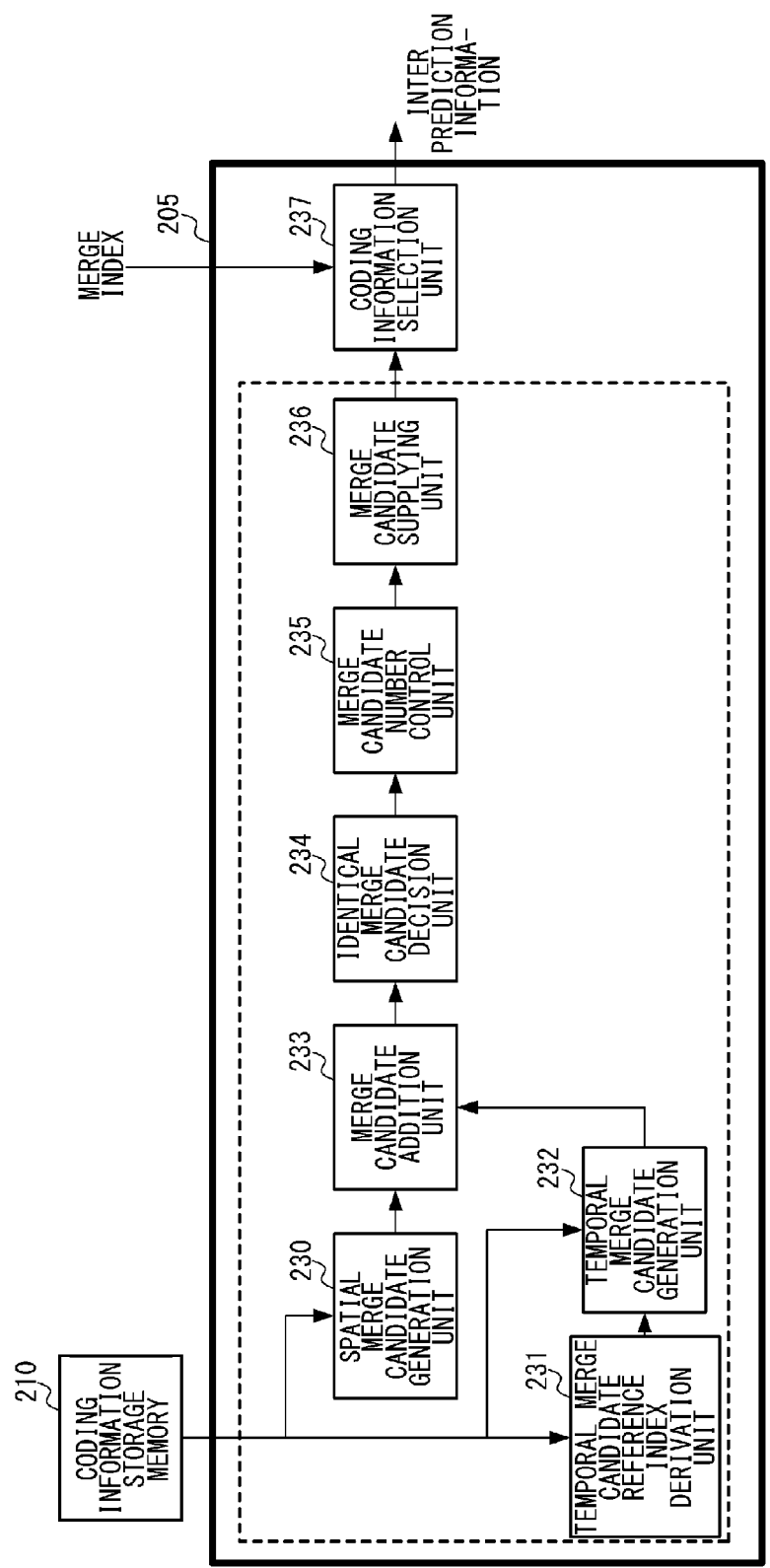
FIG. 13 is a block diagram showing the detailed configuration of an inter prediction information derivation unit of the moving picture decoding device of FIG. 2.

The inter prediction information derivation method according to the embodiment will be described with reference to the drawings. FIG. 12 is a diagram showing the detailed configuration of the inter prediction information derivation unit 104 of the moving picture coding device of FIG. 1. FIG. 13 is a diagram showing the detailed configuration of the inter prediction information derivation unit 205 of the moving picture decoding device of FIG. 2.

The parts bounded by the thick lines in FIGS. 12 and 13 respectively represent the inter prediction information derivation unit 104 and the inter prediction information derivation unit 205.

The parts bounded by the thick dotted lines further inside indicate the parts where the inter prediction information derivation method described later is performed. The moving picture decoding device corresponding to the moving picture coding device according to the embodiment contains a similar part so that the consistent, same result of derivation is obtained on the coding side and the decoding side.

The inter prediction information derivation unit 104 includes a spatial merge candidate generation unit 130, a temporal merge candidate reference index derivation unit 131, a temporal merge candidate generation unit 132, a merge candidate addition unit 133, an identical merge candidate decision unit 134, a merge candidate number control unit 135, a merge candidate supplying unit 136, and a coding information selection unit 137.

The inter prediction information derivation unit 205 includes a spatial merge candidate generation unit 230, a temporal merge candidate reference index derivation unit 231, a temporal merge candidate generation unit 232, a merge candidate addition unit 233, an identical merge candidate decision unit 234, a merge candidate number control unit 235, a merge candidate supplying unit 236, and a coding information selection unit 237.

Figure 14:
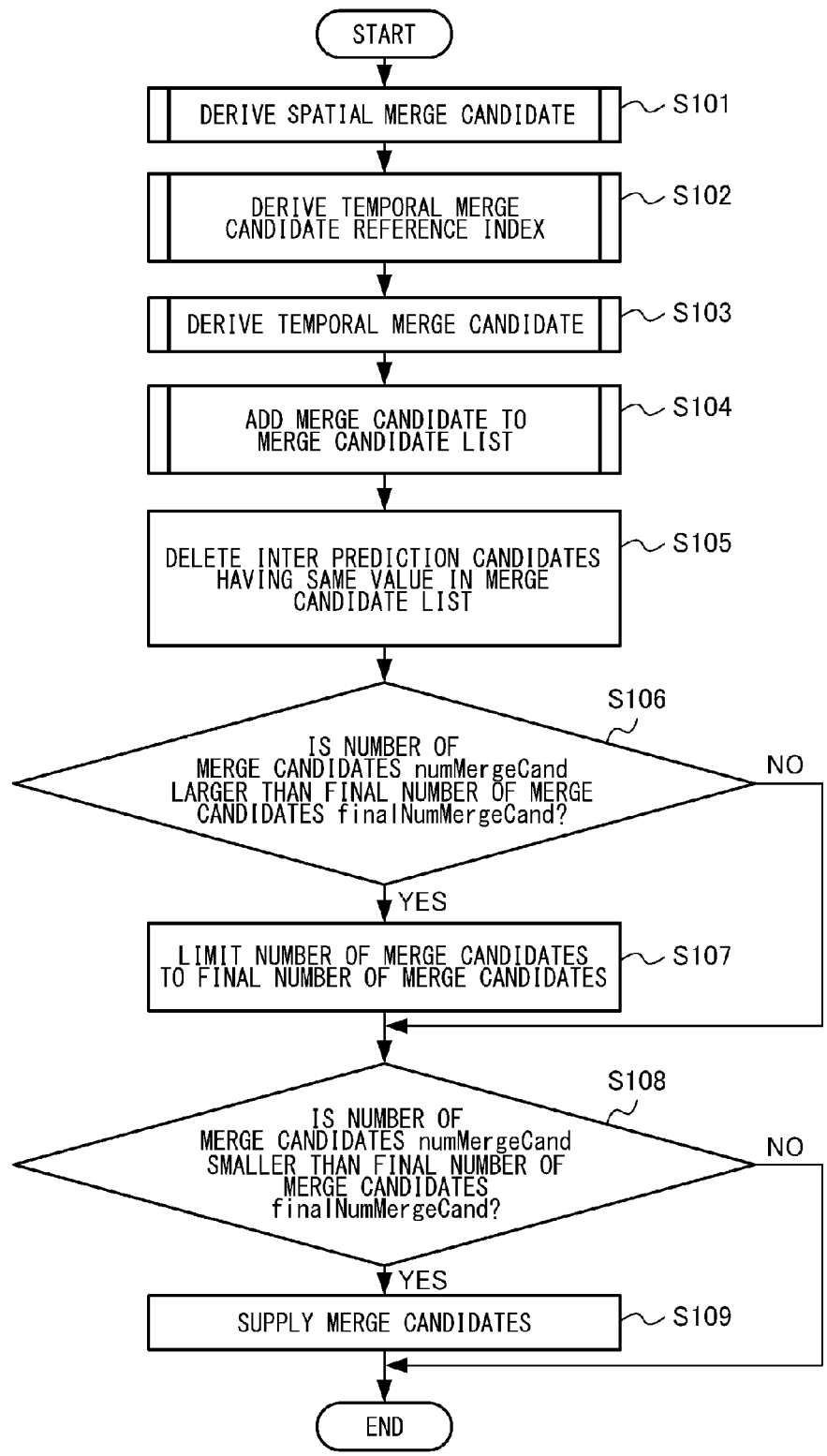
FIG. 14 is a flowchart explaining the processing steps of deriving a merge candidate and building a merge candidate list in the merge mode.

FIG. 14 is a flowchart explaining the processing steps of a process of deriving merge candidates and a process of building a merge candidate list commonly performed in the inter prediction information derivation unit 104 of the moving picture coding device and in the inter prediction information derivation unit 205 of the moving picture decoding device according to the embodiment of the present invention. The steps will be described in sequence. Unless otherwise noted, an explanation will be given in the following regarding a case where a slice type slice_type is a B slice. However, the explanation can be also applied to the case of a P slice. If the slice type slice_type is a P slice, there is only L0 prediction (Pred_L0) available as an inter prediction mode, and there is no L1 prediction (Pred_L1) or bi-prediction (Pred_BI). Thus, processes related to L1 can be omitted.

The spatial merge candidate generation unit 130 of the inter prediction information derivation unit 104 of the moving picture coding device and the spatial merge candidate generation unit 230 of the inter prediction information derivation unit 205 of the moving picture decoding device derive spatial merge candidates A, B, C, D, and E from prediction blocks A, B, C, D, and E each neighboring a block subject to coding or decoding, respectively. N indicating any one of A, B, C, D, E, and Col is defined. The spatial merge candidate generation unit 130 and the spatial merge candidate generation unit 230 output a flag availableFlagN indicating whether inter prediction information of a prediction block N can be used as a merge candidate N, an L0 reference index refIdxL0N, an L1 reference index refIdxL1N, an L0 prediction flag predFlagL0N indicating whether L0 prediction is performed, an L1 prediction flag predFlagL1N indicating whether L1 prediction is performed, an L0 motion vector mvL0N, and an L1 motion vector mvL1N (step S101). The detailed processing steps of step S101 will be described later in detail using the flowchart of FIG. 15.

Subsequently, the temporal merge candidate reference index derivation unit 131 of the inter prediction information derivation unit 104 of the moving picture coding device and the temporal merge candidate reference index derivation unit 231 of the inter prediction information derivation unit 205 of the moving picture decoding device derive a reference index of a temporal merge candidate from a prediction block neighboring the block subject to coding or decoding. In performing inter prediction using inter prediction information of a temporal merge candidate when the slice type slice_type is a P slice, the temporal merge candidate reference index derivation unit 131 and the temporal merge candidate reference index derivation unit 231 derive only an L0 reference index to perform L0 prediction (Pred_L0). In performing inter prediction using inter prediction information of a temporal merge candidate when the slice type slice_type is a B slice, the temporal merge candidate reference index derivation unit 131 and the temporal merge candidate reference index derivation unit 231 derive L0 and L1 reference indices to perform bi-prediction (Pred_BI). The detailed processing steps of step S102 will be described later in detail using the flowchart of FIG. 16.

Subsequently, the temporal merge candidate generation unit 132 of the inter prediction information derivation unit 104 of the moving picture coding device and the temporal merge candidate generation unit 232 of the inter prediction information derivation unit 205 of the moving picture decoding device derive a temporal merge candidate from a picture at a different point of time and output a flag availableFlagCol indicating whether the candidate is available, an L0 prediction flag predFlagL0Col indicating whether L0 prediction is performed, an L1 prediction flag predFlagL1Col indicating whether L1 prediction is performed, an L0 motion vector mvL0N, and an L1 motion vector mvL1N (step S103). The detailed processing steps of step S103 will be described later in detail using the flowchart of FIG. 17.

Subsequently, the merge candidate addition unit 133 of the inter prediction information derivation unit 104 of the moving picture coding device and the merge candidate addition unit 233 of the inter prediction information derivation unit 205 of the moving picture decoding device construct a merge candidate list mergeCandList and adds motion vector predictor candidates A, B, C, D, and Col in the list (step S104). The detailed processing steps of step S104 will be described later in detail using the flowchart of FIG. 24.

Subsequently, if merge candidates in the merge candidate list mergeCandList have the same reference index and the same motion vector value, the identical merge candidate decision unit 134 of the inter prediction information derivation unit 104 of the moving picture coding device and the identical merge candidate decision unit 234 of the inter prediction information derivation unit 205 of the moving picture decoding device remove the associated merge candidates except for the merge candidate with the smallest index (step S105).

Subsequently, the merge candidate number control unit 135 of the inter prediction information derivation unit 104 of the moving picture coding device and the merge candidate number control unit 235 of the inter prediction information derivation unit 205 of the moving picture decoding device count the number of merge candidates numMergeCand added to the merge candidate list mergeCandList. If the number of merge candidates added to the merge candidate list mergeCandList is larger than the final number of merge candidates finalNumMergeCand (YES in step S106), the merge candidate number control unit 135 and the merge candidate number control unit 235 limit the merge candidates to be the final number of merge candidates finalNumMergeCand by deleting all merge candidates having an index i in the merge candidate list mergeCandList that is larger than (finalNumMergeCand−1) and update the value of the number of merge candidates numMergeCand added to the merge candidate list mergeCandList to be the final number of merge candidates finalNumMergeCand (step S107).

Subsequently, if the number of merge candidates numMergeCand added to the merge candidate list mergeCandList is smaller than the final number of merge candidates finalNumMergeCand (YES in step S108), the merge candidate supplying unit 136 of the inter prediction information derivation unit 104 of the moving picture coding device and the merge candidate supplying unit 236 of the inter prediction information derivation unit 205 of the moving picture decoding device supply merge candidates while having the final number of merge candidates finalNumMergeCand as an upper limit for the number of merge candidates numMergeCand added to the merge candidate list mergeCandList and update the value of the number of merge candidates numMergeCand added to the merge candidate list mergeCandList to be the final number of merge candidates finalNumMergeCand (step S109). Having the final number of merge candidates finalNumMergeCand as the upper limit, the merge candidate supplying unit 136 and the merge candidate supplying unit 236 add a merge candidate having a different reference index, a motion vector of (0,0) (both the horizontal and vertical components are 0), and a prediction mode of L0 prediction (Pred_L0) in the case of a P slice. The merge candidate supplying unit 136 and the merge candidate supplying unit 236 add a merge candidate having a prediction mode of bi-prediction (Pred_BI) in which a combination of L0 prediction and L1 prediction of merge candidates that are added is changed or a merge candidate having a different reference index, a motion vector of (0,0), and a prediction mode of bi-prediction (Pred_BI) in the case of a B slice.

In the present embodiment, the final number of merge candidates finalNumMergeCand is set to a fixed number in units of slices. The reason for fixing the final number of merge candidates finalNumMergeCand is because a change of the final number of merge candidates finalNumMergeCand according to the building status of the merge candidate list causes a dependence relationship between entropy decoding and the building of the merge candidate list, and a merge index thus cannot be entropy decoded until the building of a merge candidate list for each prediction block and the derivation of the final number of merge candidates finalNumMergeCand on the decoding side, causing delay in the decoding of the merge index and making the entropy decoding complicated. Further, there is a problem where if the entropy decoding depends on the building status of the merge candidate list including a merge candidate Col derived from a prediction block at a different point of time, a normal final number of merge candidates finalNumMergeCand cannot be derived when there is an error at the time of decoding bitstream of another picture since a bitstream of the current picture is also influenced by the error, and the entropy decoding can no longer be continued. If the final number of merge candidates finalNumMergeCand is set to be a fixed number in units of slices as in the present embodiment, the derivation of the final number of merge candidates finalNumMergeCand in units of prediction blocks is no longer necessary. Thus, independently from the building of the merge candidate list, the merge index can be entropy decoded, and even when there is an error at the time of decoding a bitstream of another picture, the entropy decoding of the bitstream of the current picture can be continued without being influenced by the error.

Figure 15:
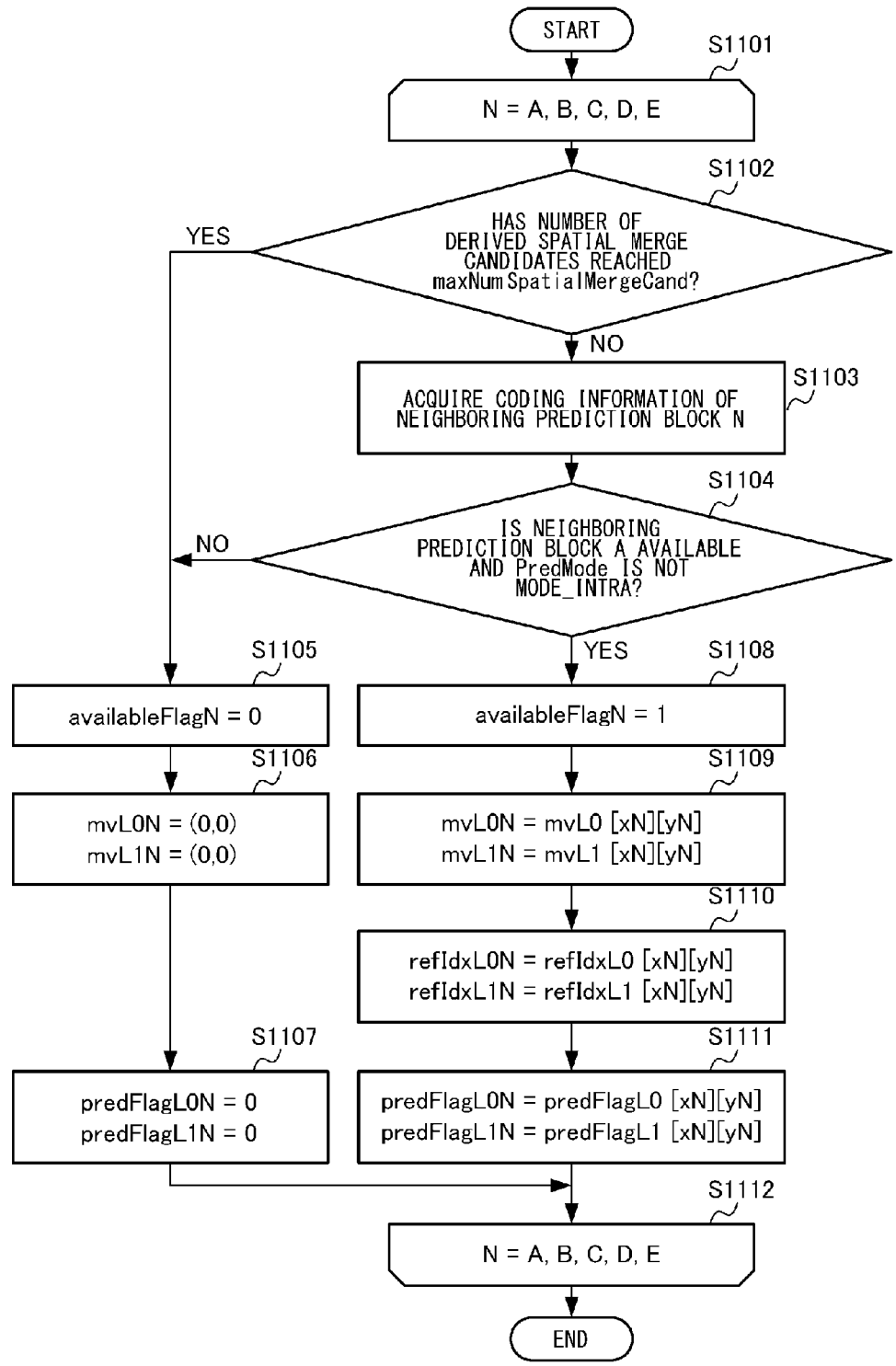
FIG. 15 is a flowchart explaining the processing steps of deriving a spatial merge candidate in the merge mode.

A detailed explanation will be now given of a method of deriving the merge candidate N from a prediction block N neighboring the block subject to coding or decoding, which is a processing step in step S101 of FIG. 14. FIG. 15 is a flowchart explaining the processing steps of spatial merge candidate derivation in step S101 of FIG. 14. A (left), B (above), C (top right), D (bottom left), or E (top left) indicating an area of the neighboring prediction block is substituted into N. In the present embodiment, the upper limit value of the number of spatial merge candidates maxNumSpatialMergeCand is set to be 4, and a maximum of four spatial merge candidates are derived from five neighboring prediction blocks. The upper limit value of the number of spatial merge candidates maxNumSpatialMergeCand added to the merge candidate list mergeCandList in units of slices can be also set. When a large value is set for the upper limit value of the number of spatial merge candidates maxNumSpatialMergeCand, the scope of selection of merge candidates is broadened, and the coding efficiency is thus improved. However, processing volume for the decision on whether merge candidates are identical becomes larger since the number of merge candidates subject to the decision on whether merge candidates are identical is increased. Thus, in order to reduce the processing volume, the upper limit value of the number of spatial merge candidates maxNumSpatialMergeCand may be set in units of slices so as to control processing volume for the derivation of special merge candidates and processing volume for the decision on whether merge candidates are identical. For example, since the final number of merge candidates finalNumSpatialMergeCand is set to be 3 if the slice type slice_type is a P slice in the present embodiment, spatial merge candidates are likely to be deleted in the process in step S107 of FIG. 14 even when four spatial merge candidates are derived. Thus, even when the upper limit value of the number of spatial merge candidates maxNumSpatialMergeCand is set to be 3 or 2, processing volume can be reduced for the decision on whether merge candidates are identical, which is performed by the identical merge candidate decision unit 134 of the inter prediction information derivation unit 104 of the moving picture coding device and the identical merge candidate decision unit 234 of the inter prediction information derivation unit 205 of the moving picture decoding device, while reducing a decrease in the coding efficiency.

Referring to FIG. 15, the coding information of the prediction block A neighboring the prediction block subject to coding or decoding to the left is examined using a variable N that is set to A so as to derive the merge candidate A, the coding information of the prediction block B neighboring above is examined using a variable N that is set to B so as to derive the merge candidate B, the coding information of the prediction block C neighboring at top right is examined using a variable N that is set to C so as to derive the merge candidate C, the coding information of the prediction block D neighboring at bottom left is examined using a variable N that is set to D so as to derive the merge candidate D, and the coding information of the prediction block E neighboring at top left is examined using a variable N that is set to E so as to derive the merge candidate E (steps S1101-S1112).

First, if the total number of spatial merge candidates that have been derived thus far (availableFlag is 1) is the upper limit value of the number of spatial merge candidates maxNumSpatialMergeCand (YES in step S1102), in other words, if four spatial merge candidates have been derived, the flag availableFlagN of the merge candidate N is set to 0 (step S1105), both the values of motion vectors mvL0N and mvL1N of the merge candidate N are set to (0,0) (step S1106), both the values of the flags predFlagL0N and predFlagL1N of the merge candidate N are set to 0 (step S1107), and the spatial merge candidate derivation process is ended. In the present embodiment, four merge candidates are derived from neighboring prediction blocks. Thus, no more spatial merge candidate derivation process needs to be performed if four spatial merge candidates have already been derived.

On the other hand, if the total number of spatial merge candidates that have been derived thus far (availableFlag is 1) is not the upper limit value of the number of spatial merge candidates maxNumSpatialMergeCand (NO in step S1102), the prediction block N neighboring the prediction block subject to coding or decoding is identified, and if the prediction block N is available, the coding information of the prediction block N is derived from the coding information storage memory 115 or 210 (step S1103).

If the neighboring prediction block N is not available or if the prediction mode PredMode of the prediction block N is intra prediction (MODE_INTRA) (NO in S1104), the value of the flag availableFlagN of the merge candidate N is set to 0 (step S1105), both the values of motion vectors mvL0N and mvL1N of the merge candidate N are set to (0,0) (step S1106), and both the values of the flags predFlagL0N and predFlagL1N of the merge candidate N are set to 0 (step S1107).

Meanwhile, if the neighboring prediction block N is available and if the prediction mode PredMode of the prediction block N is not intra prediction (MODE_INTRA) (YES in S1104), the inter prediction information of the prediction block N is set to be the inter prediction information of the merge candidate N. The value of the flag availableFlagN of the merge candidate N is set to 1 (step S1108), the motion vectors mvL0N and mvL1N of the merge candidate N are respectively set to be the same values as the respective values of motion vectors mvL0N[xN][yN] and mvL1N[xN] [yN] of the prediction block N (step S1109), the reference indices refIdxL0N and refIdxL1N of the merge candidate N are respectively set to be the same values as the respective values of reference indices refIdxL0N[xN][yN] and refIdxL1N[xN][yN] of the prediction block N (step S1110), and the flags predFlagL0N and predFlagL1N of the merge candidate N are respectively set to flags predFlagL0N[xN][yN] and predFlagL1N[xN][yN] of the prediction block N (step S1111). xN and yN are indices indicating the position of the top left pixel in the prediction block N in the picture.

The above processes in steps S1102-S1111 are repeated for N=A, B, C, D, E each (steps S1101-S1112).

A detailed explanation will be now given of a method of deriving a reference index of a temporal merge candidate in S102 of FIG. 14. L0 and L1 reference indices of a temporal merge candidate are derived.

In the present embodiment, a reference index of a temporal merge candidate is derived using a reference index of a spatial merge candidate, i.e., a reference index used in a prediction block neighboring a block subject to coding or decoding. This is because a reference index of a prediction block subject to coding or decoding has high correlation with a reference index of a prediction block neighboring a block subject to coding or decoding, which serves as a merge candidate, in the case that a temporal merge candidate is selected. In particular, in the present embodiment, only a reference index of the prediction block A neighboring the left side of the prediction block subject to coding or decoding and a reference index of the prediction block B neighboring the upper side of the prediction block subject to coding or decoding are used. This is because among the neighboring prediction blocks A, B, C, D, and E also serving as spatial merge candidates, the prediction blocks A and B, which are in contact with a side of the prediction block subject to coding or decoding, have higher correlation compared to the prediction blocks C, D, and E, which are in contact with only a vertex of the prediction block subject to coding or decoding. By limiting prediction blocks that are to be used to be the prediction blocks A and B without using the prediction blocks C, D, and E having relatively low correlation, an effect of improving the coding efficiency is obtained by the derivation of a reference index of a temporal merge candidate, and computation volume and memory access volume that are related to a process of deriving the reference index of the temporal merge candidate are reduced.

In the present embodiment, if both the prediction block A and the prediction block B perform LX prediction (a list subject to derivation of a reference index of the temporal merge candidate, which is L0 or L1, is set as LX, and prediction using LX is set as LX prediction; and these expressions are hereinafter used in this sense unless otherwise noted), the smaller value of an LX reference index of the prediction block A and an LX reference index of the prediction block B is employed as the value of an LX reference index of the temporal merge candidate. If either one of the prediction block A and the prediction block B performs LX prediction, an LX reference index of a prediction block that performs LX prediction is employed as the value of the LX reference index of the temporal merge candidate. If neither of the prediction block A and the prediction block B performs LX prediction, the value of the LX reference index of the temporal merge candidate is set to be a default value of 0.

The reason for setting the value of the LX reference index of the temporal merge candidate to be a default value of 0 if neither of the prediction block A and the prediction block B performs LX prediction is because a reference picture that corresponds to a reference index value of 0 is most likely to be selected in inter prediction. The default value of the reference index is not limited to 0 and may be set to be a value other than 0 (1, 2, or the like). Alternatively, syntax elements each indicating the default value of the reference index may be set, in a transmittable manner, in a bitstream in units of sequences, pictures, or slices such that the syntax elements can be selected on the coding side.

Figure 16:
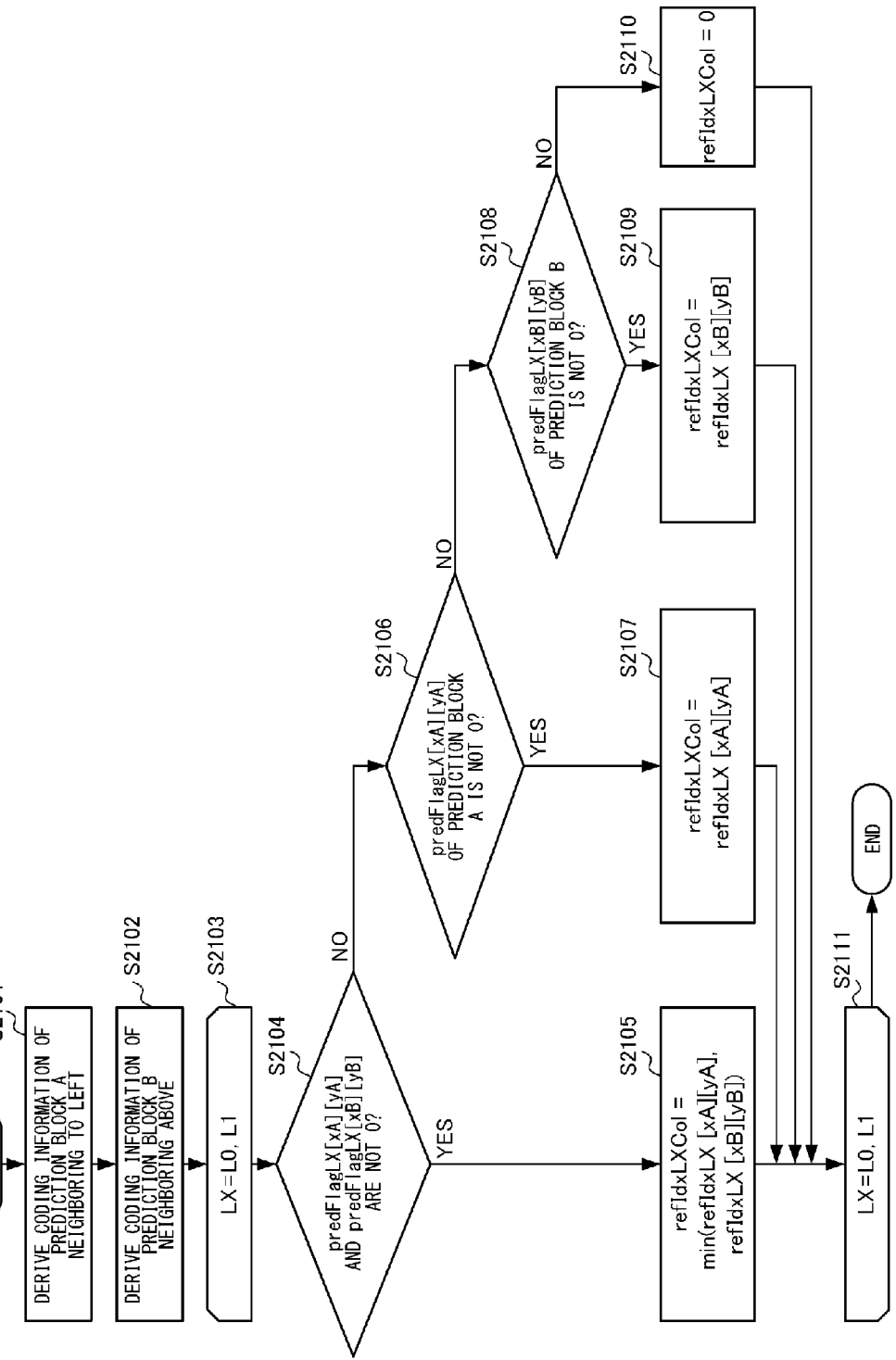
FIG. 16 is a flowchart explaining the processing steps of deriving a reference index of a temporal merge candidate in the merge mode.

FIG. 16 is a flowchart explaining the processing steps of deriving the reference index of the temporal merge candidate in step S102 of FIG. 14. First, the coding information of the prediction block A neighboring to the left and the coding information of the prediction block B are derived from the coding information storage memory 115 or 210 (steps S2101 and S2102). Processes in subsequent steps S2104 to S2110 are performed for each of L0 and L1 (steps S2103-S2111). LX is set to L0 when the L0 reference index of the temporal merge candidate is derived, and LX is set to L1 when the L1 reference index is derived. If the slice type slice_type is a P slice, there is only L0 prediction (Pred_L0) available as an inter prediction mode, and there is no L1 prediction (Pred_L1) or bi-prediction (Pred_BI). Thus, processes related to L1 can be omitted.

If neither of the predFlagLX[xA] [yA] of the prediction block A indicating whether LX prediction is performed and the predFlagLX[xB] [yB] of the prediction block B indicating whether LX prediction is performed is 0 (YES in step S2104), the LX reference index refIdxLXCol of the temporal merge candidate is set to be the same as the smaller value of the value of the LX reference index refIdxLX[xA] [yA] of the prediction block A and the value of the LX reference index refIdxLX[xB] [yB] of the prediction block B (step S2105). xA and yA are indices indicating the position of the top left pixel in the prediction block A in the picture. xB and yB are indices indicating the position of the top left pixel in the prediction block B in the picture.

In the present embodiment, in the prediction block N (N=A, B), if the prediction block N is not available outside a slice subject to coding or decoding, if the prediction block N is not available since the prediction block N comes after the prediction block subject to coding or decoding in coding or decoding order and is thus not coded or decoded yet, or if the prediction mode PredMode of the prediction block N is inter prediction (MODE_INTER), the flag predFlagL0 [xN][yN] indicating whether L0 prediction is to be used and the flag predFlagL1 [xN] [yN] indicating whether L1 prediction is to be used are both 0. xN and yN are indices indicating the position of the top left pixel in the prediction block N in the picture. If the prediction mode PredMode of the prediction block N is inter prediction (MODE_INTER) and the inter prediction mode is L0 prediction (Pred_L0), the flag predFlagL0[xN][yN] of the prediction block N indicating whether L0 prediction is to be used is 1, and the flag predFlagL1[xN][yN] of the prediction block N indicating whether L1 prediction is to be used is 0. If the inter prediction mode of the prediction block N is L1 prediction (Pred_L1), the flag predFlagL0[xN] [yN] of the prediction block N indicating whether L0 prediction is to be used is 0, and the flag predFlagL1[xN][yN] of the prediction block N indicating whether L1 prediction is to be used is 1. If the inter prediction mode of the prediction block N is bi-prediction (Pred_BI), both the flag predFlagL0[xN] [yN] of the prediction block N indicating whether L0 prediction is to be used and the flag predFlagL1[xN][yN] of the prediction block N indicating whether L1 prediction is to be used are 1.

If the predFlagLX[xA][yA] of the prediction block A indicating whether LX prediction is performed is not 0 and if the predFlagLX[xB][yB] of the prediction block B indicating whether LX prediction is performed is 0 (NO in step S2104 and YES in step S2106), the LX reference index refIdxLXCol of the temporal merge candidate is set to be the same as the value of the LX reference index refIdxLX[xA] [yA] of the prediction block A (step S2107). xA and yA are indices indicating the position of the top left pixel in the prediction block A in the picture. xB and yB are indices indicating the position of the top left pixel in the prediction block B in the picture.

If the predFlagLX[xA][yA] of the prediction block A indicating whether LX prediction is performed is 0 and if the predFlagLX[xB][yB] of the prediction block B indicating whether LX prediction is performed is not 0 (NO in step S2104, NO in step S2106, and YES in step S2108), the LX reference index refIdxLXCol of the temporal merge candidate is set to be the same as the value of the LX reference index refIdxLX[xB] [yB] of the prediction block B (step S2109).

If both the predFlagLX[xA] [yA] of the prediction block A indicating whether LX prediction is performed and the predFlagLX[xB][yB] of the prediction block B indicating whether LX prediction is performed are 0 (NO in step S2104, NO in step S2106, and NO in step S2108), the LX reference index refIdxLXCol of the temporal merge candidate is set to be the default value of 0 (step S2110).

The processes in steps S2104 to S2110 that are performed for each of L0 and L1 are performed (steps S2103-S2111), and the process of deriving the reference index is ended.

Figure 17:
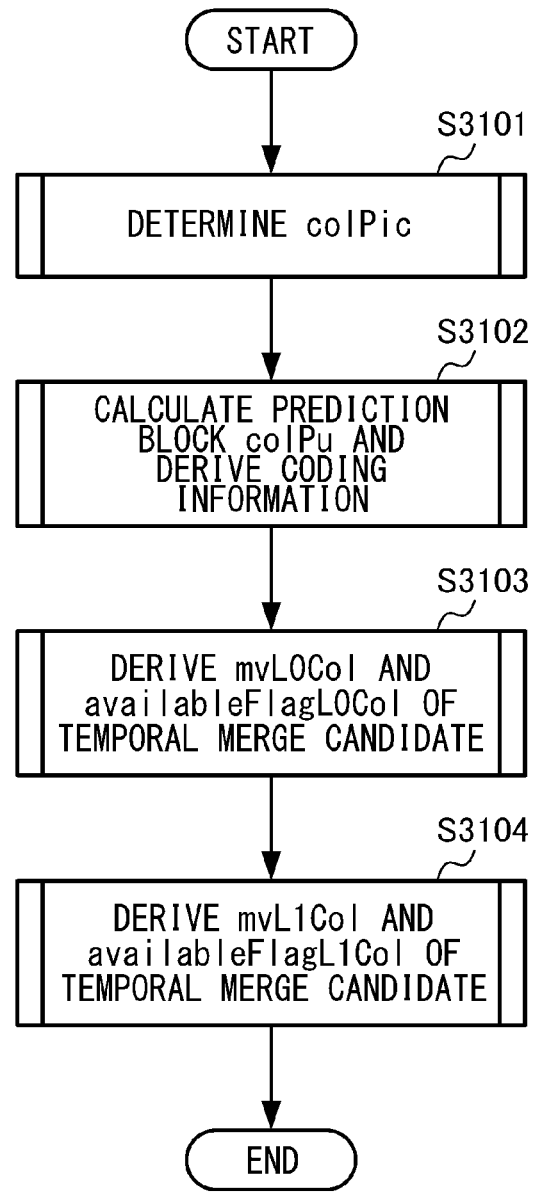
FIG. 17 is a flowchart explaining the processing steps of deriving a temporal merge candidate in the merge mode.

A detailed explanation will be now given of a method of deriving a merge candidate at a different point of time in S103 of FIG. 14. FIG. 17 is a flowchart explaining the processing steps of temporal merge candidate derivation in step S103 of FIG. 14.

Figure 26:
FIG. 26 is a diagram explaining a bitstream syntax of a slice header that is related to the merge mode.

As shown in an example of a syntax rule, which is a rule common to coding and decoding of a bitstream, in FIG. 26, a picture colPic located at a different point of time is derived by a slice type slice_type defined in a slice header in units of slices and by a flag collocated_from_l0_flag indicating which of the L0 reference list and the L1 reference list for the picture including the target prediction block includes the picture colPic located at a different point of time and used to derive the motion vector predictor candidate or the merge candidate in the temporal dimension (step S3101).

Figure 18:
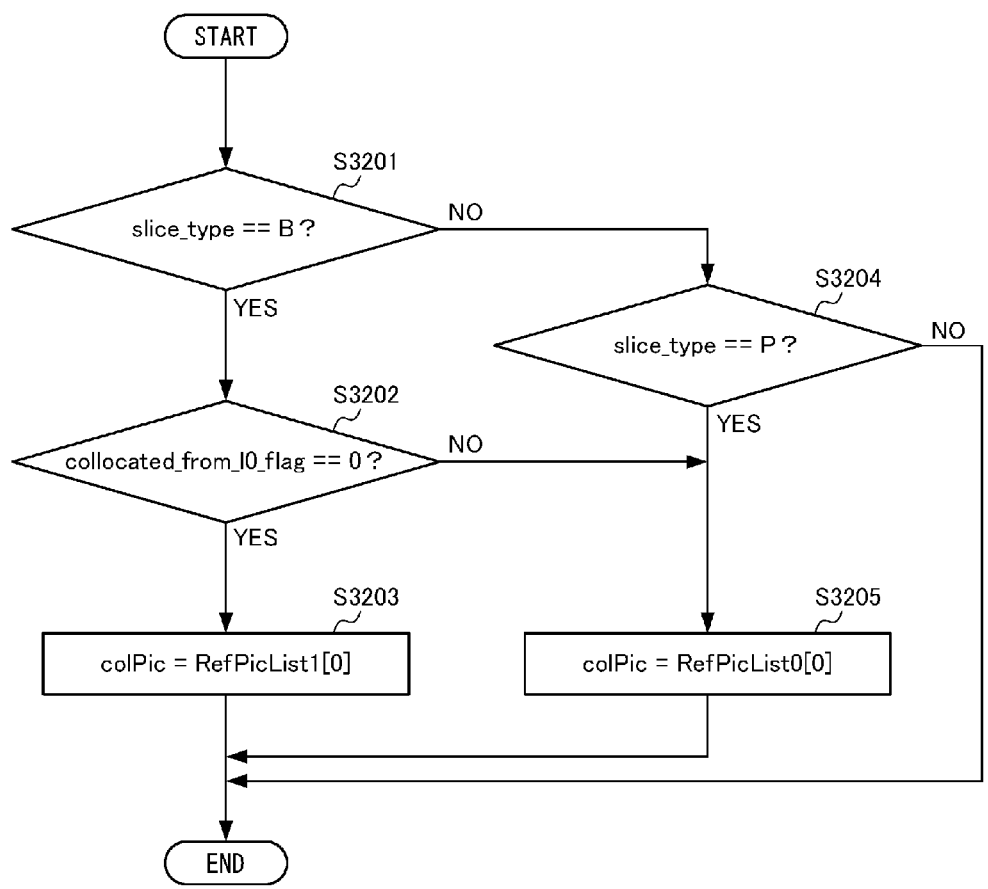
FIG. 18 is a flowchart explaining the processing steps of deriving a picture located at a different point of time in the merge mode.

FIG. 18 is a flowchart showing the processing steps of deriving the picture colPic located at a different point of time in step S3101 of FIG. 17. If the slice type slice_type is a B slice, and if the flag collocated_from_l0_flag is 0 (YES in S3201, YES in S3202), RefPicList1[0], i.e., the picture in a reference list L1 with a reference index of 0 will be the picture colPic located at a different point of time (step S3203). If not, i.e., if the slice type slice_type is a B slice and if the previously-stated flag collocated_from_l0_flag is 1 (YES in S3201, YES in S3202), or if the slice type slice_type is a P slice (NO in S3201, YES in S3204), RefPicList1 [0], i.e., the picture in a reference list L0 with a reference index of 0 will be the picture colPic located at a different point of time (step S3205).

Referring back to the flowchart of FIG. 17, a prediction block colPU located at a different point of time is derived, and coding information is derived accordingly (step S3102).

Figure 19:
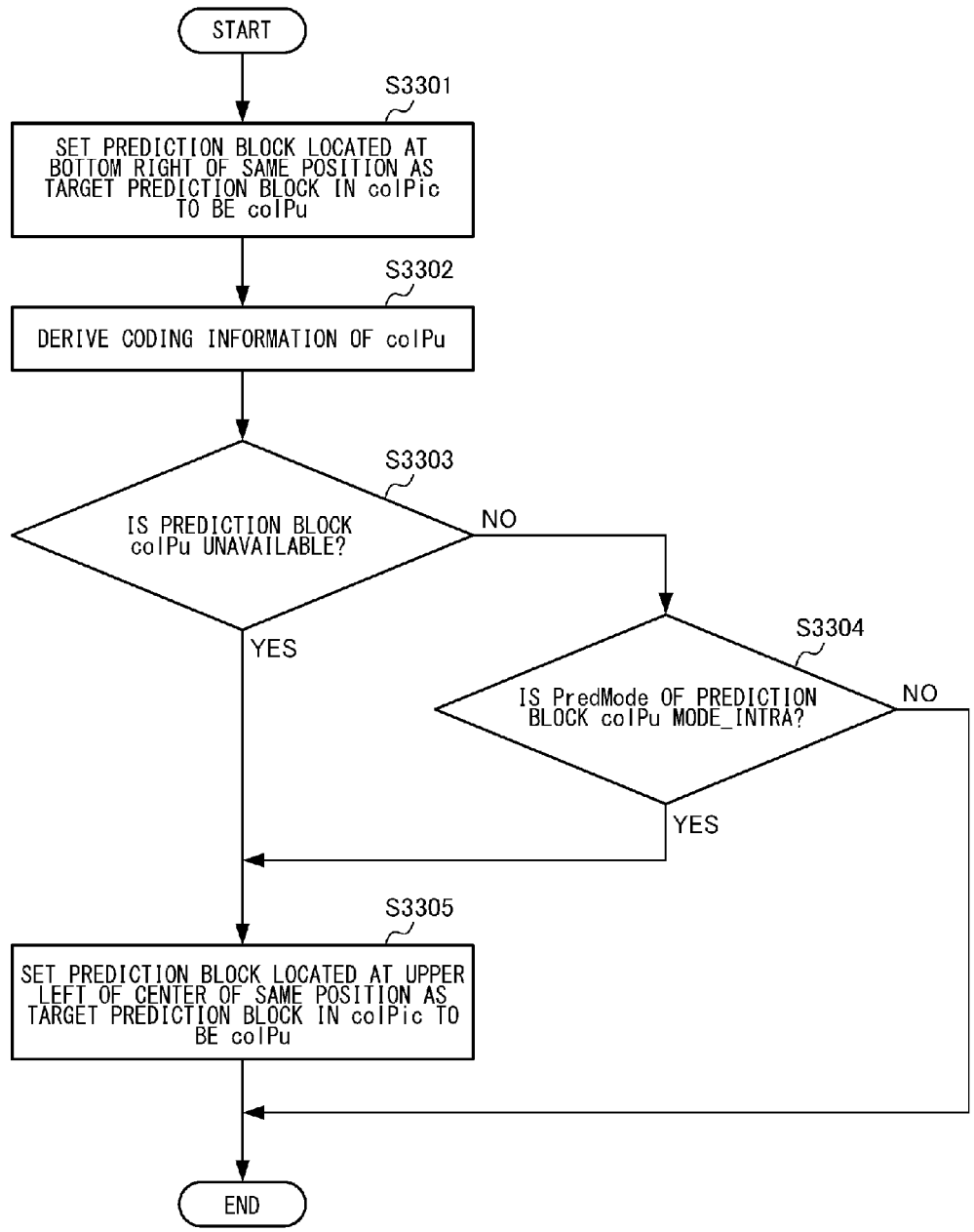
FIG. 19 is a flowchart explaining the processing steps of deriving a prediction block of a picture at a different point of time in the merge mode.

FIG. 19 is a flowchart explaining the processing steps of deriving a prediction block colPU of the picture colPic located at a different point of time in step S3102 of FIG. 17.

First, a prediction block located at bottom right (outside) of the target prediction block in the picture colPic located at a different point of time is defined as a prediction block colPU located at a different point of time (step S3301). The prediction block corresponds to the prediction block T0 of FIG. 9.

Then, the coding information of the prediction block colPU located at a different point of time is derived (step S3302). If PredMode of the prediction block colPU located at a different point of time is not available or if PredMode of the prediction block colPU located at a different point of time is intra prediction (MODE_INTRA) (YES in step S3303, YES in step S3304), the prediction block located at the upper left of the center of the target prediction block in the picture colPic located at a different point of time is defined as the prediction block colPU located at a different point of time (step S3305). The prediction block corresponds to the prediction block T1 of FIG. 9.

Referring back to the flowchart of FIG. 17, an L0 motion vector predictor mvL0Col derived from a prediction block of another picture located at the same position as the prediction block subject to coding or decoding and the flag availableFlagL0Col indicating whether or not a temporal merge candidate Col is valid are derived (step S3103), and an L1 motion vector predictor mvL1Col and a flag availableFlagL1Col indicating whether or not the temporal merge candidate Col is valid are derived (step S3104). Further, if the flag availableFlagL0Col or the flag availableFlagL1Col is 1, a flag availableFlagCol indicating whether or not the temporal candidate Col is valid is set to 1.

Figure 20:
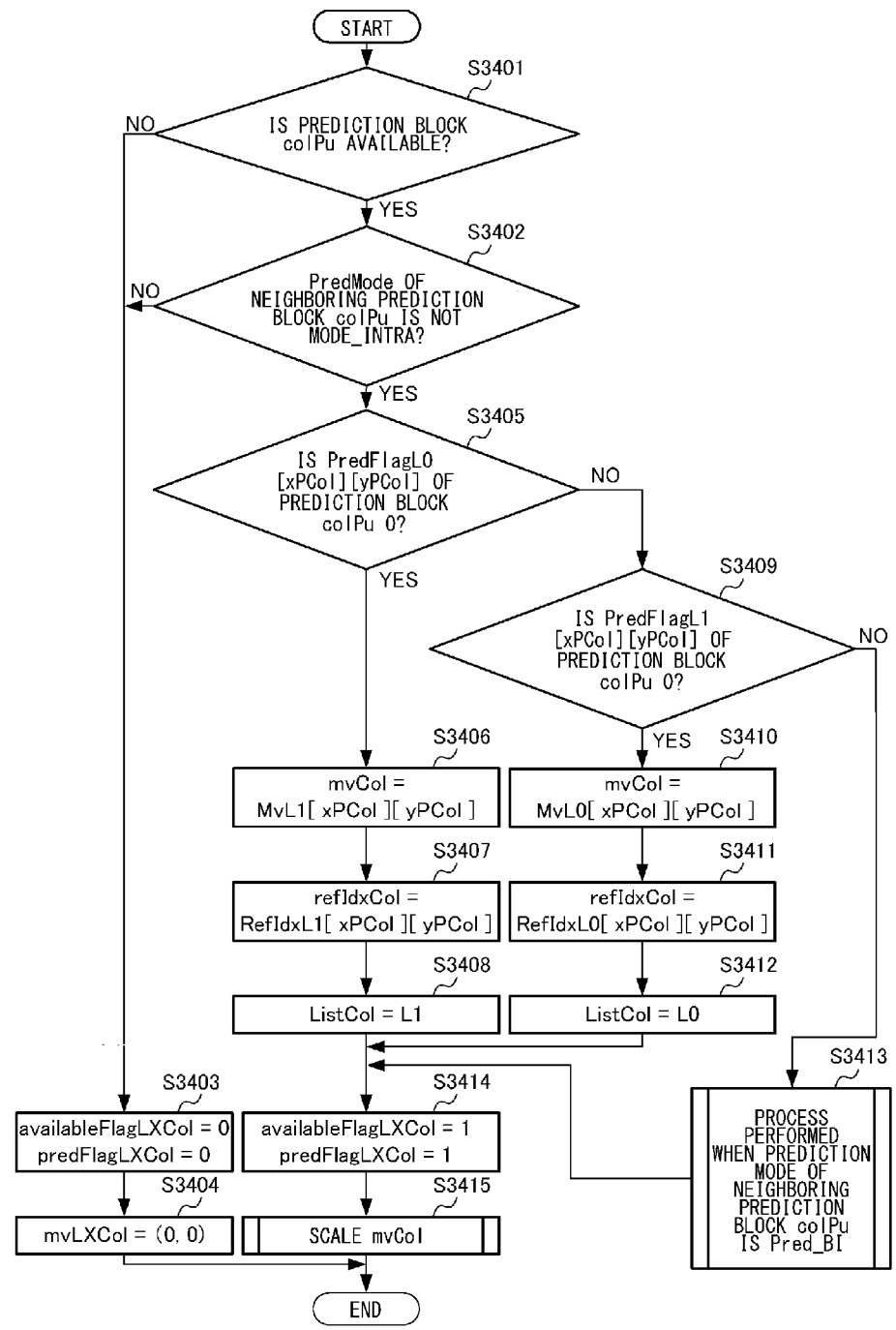
FIG. 20 is a flowchart explaining the processing steps of deriving a temporal merge candidate in the merge mode.

FIG. 20 is a flowchart explaining the processing steps of deriving inter prediction information of the temporal merge candidate in step S3103 and step S3104 of FIG. 17. A list subject to derivation of the temporal merge candidate, which is L0 or L1, is set as LX, and prediction using LX is set as LX prediction. These expressions are hereinafter used in this sense unless otherwise noted. When called in step S3103, which is a process of deriving L0 of the temporal merge candidate, LX becomes L0. When called in step S3104, which is a process of deriving L1 of the temporal merge candidate, LX becomes L1.

If the prediction mode PredMode of the prediction block colPU located at a different point of time is intra prediction (MODE_INTRA) or if the block is not available (NO in step S3401, NO in S3402), both the flag availableFlagLXCol ad the flag predFlagLXCol are set to 0 (step S3403), the motion vector mvLXCol is set to (0,0) (step S3404), and the process of deriving the inter prediction information of the temporal merge candidate is ended.

If the prediction block colPU is available and the prediction mode PredMode is not intra prediction (MODE_INTRA) (YES in step S3401, YES in step S3402), mvCol, refIdxCol, and availableFlagCol are derived through the following steps.

If the flag PredFlagL0[xPCol][yPCol] indicating whether the L0 prediction of the prediction block colPU is being used is 0 (YES in step S3405), the prediction mode of the prediction block colPU is Pred_L1 so that the motion vector mvCol is set to be the same value as MvL1[xPCol][yPCol], which is the L1 motion vector of the prediction block colPU (step S3406), the reference index refIdxCol is set to be the same value as the L1 reference index RefIdxL1[xPCol] [yPCol] (step S3407), and the list ListCol is set to L1 (step S3408). xPCol and yPCol are indices indicating the position of the top left pixel in the prediction block colPU in the picture colPic located at a different point of time.

On the other hand, if the L0 prediction flag PredFlagL0 [xPCol][yPCol] of the prediction block colPU is not 0 (NO in step S3405 of FIG. 20), decision is made on whether the L1 prediction flag PredFlagL0[xPCol][yPCol] of the prediction block colPU is 0. If the L1 prediction flag PredFlagL1 [xPCol] [yPCol] of the prediction block colPU is 0 (YES in step S3409), the motion vector mvCol is set to be the same value as MvL0[xPCol][yPCol], which is the L0 motion vector of the prediction block colPU (step S3410), the reference index refIdxCol is set to be the same value as the L0 reference index RefIdxL0[xPCol] [yPCol] (step S3411), and the list ListCol is set to L0 (step S3412).

If neither of the L0 prediction flag PredFlagL0[xPCol] [yPCol] of the prediction block colPU and the L1 prediction flag PredFlagL1[xPCol] [yPCol] of the prediction block colPU is 0 (NO in step S3405, NO in step S3409), the prediction mode of the prediction block colPU is bi-prediction (Pred_BI) so that one of the two L0 and L1 motion vectors is selected (step S3413).

Figure 21:
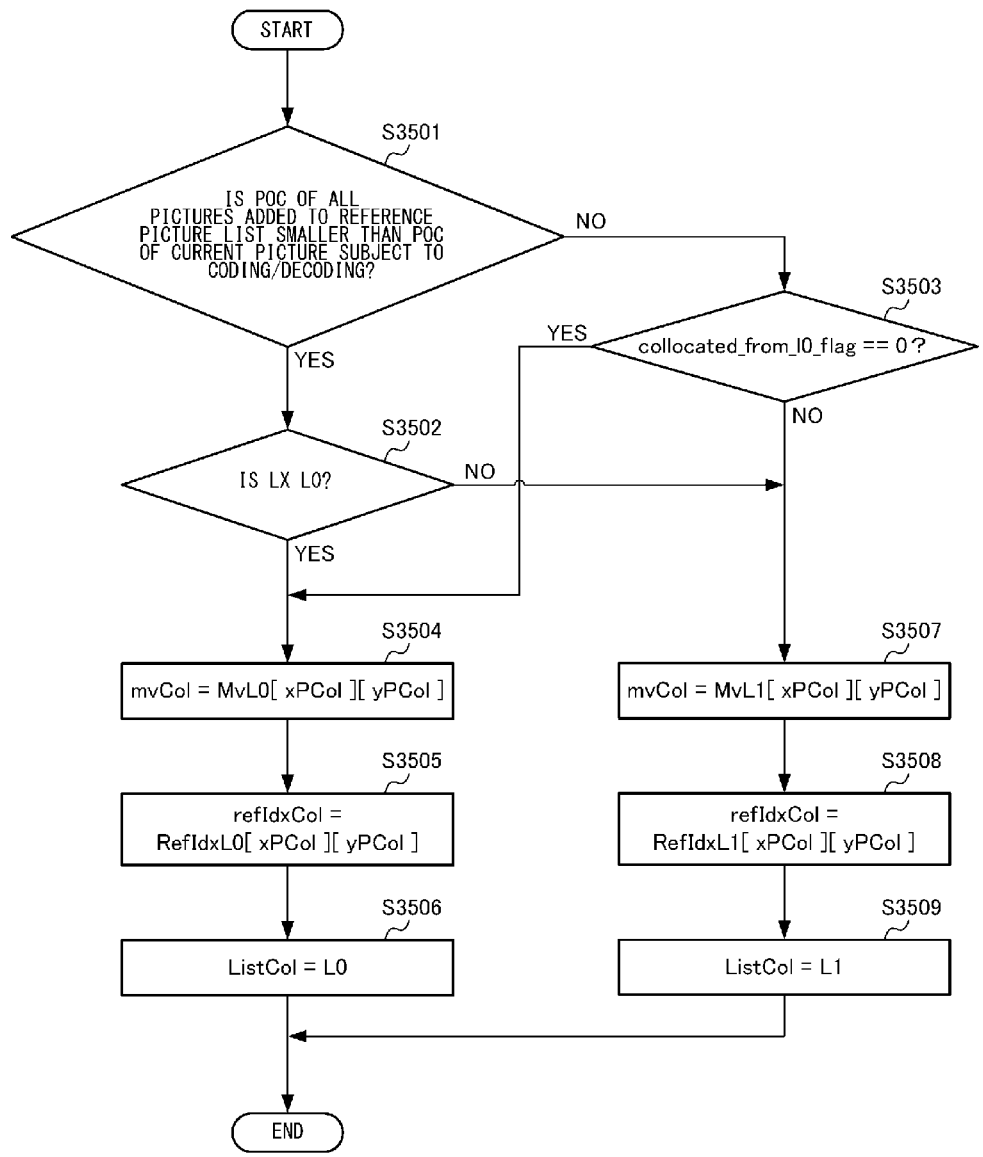
FIG. 21 is a flowchart explaining the processing steps of deriving a temporal merge candidate in the merge mode.

FIG. 21 is a flowchart showing the processing steps of deriving the inter prediction information of the temporal merge candidate when the inter prediction mode of the prediction block colPU is bi-prediction (Pred_BI).

First, whether POCs of all pictures added to all reference lists are smaller than the POC of the current picture subject to coding or decoding is determined (step S3501). If the respective POCs of all pictures added to L0 and L1, which are all the reference lists of the prediction block colPU, are smaller than the POC of the current picture subject to coding or decoding (YES in step S3501), and if LX is L0, i.e., a motion vector predictor candidate of the L0 motion vector of the picture subject to coding or decoding is being derived (YES in step S3502), the L0 inter prediction information of the prediction block colPU is selected, and if LX is L1, i.e., a motion vector predictor candidate of the L1 motion vector of the picture subject to coding or decoding is being derived (NO in step S3502), the L1 inter prediction information of the prediction block colPU is selected. On the other hand, if at least one POC of the pictures added to all the reference lists L0 and L1 of the prediction block colPU is larger than the POC of the current picture subject to coding or decoding (NO in step S3501), and if the flag collocated_from_l0_flag is 0 (YES in step S3503), the L0 inter prediction information of the prediction block colPU is selected, and if the flag collocated_from_l0_flag is 1 (NO in step S3503), the L1 inter prediction information of the prediction block colPU is selected.

If the L0 inter prediction information of the prediction block colPU is selected (YES in step S3502, YES in step S3503), the motion vector mvCol is set to be the same value as MvL0[xPCol][yPCol] (step S3504), the reference index refIdxCol is set to be the same value as RefIdxL0[xPCol] [yPCol] (step S3505), and the list ListCol is set to L0 (step S3506).

If the L1 inter prediction information of the prediction block colPU is selected (NO in step S2502, NO in step S3503), the motion vector mvCol is set to be the same value as MvL1[xPCol][yPCol] (step S3507), the reference index refIdxCol is set to be the same value as RefIdxL1[xPCol] [yPCol] (step S3508), and the list ListCol is set to L1 (step S3509).

Referring back to FIG. 20, when the inter prediction information is derived from the prediction block colPU, both the flag availableFlagLXCol and the flag predFlagLXCol are set to 1 (step S3414).

Subsequently, the motion vector mvCol is scaled to obtain an LX motion vector mvLXCol of the temporal merge candidate (step S3415). An explanation will be given using FIG. 22 and FIG. 23 regarding the processing steps of a scaling operation of the motion vector.

Figure 22:
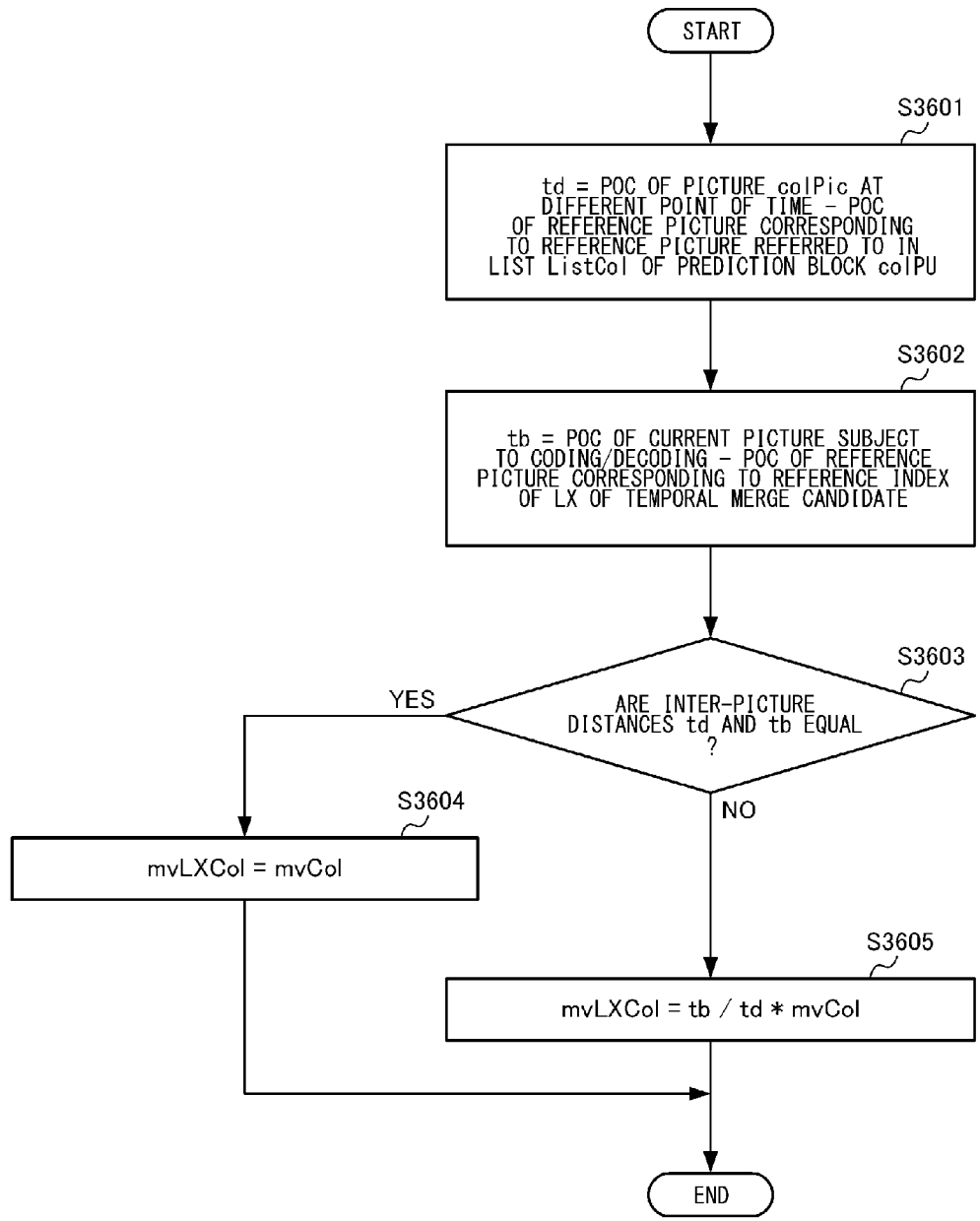
FIG. 22 is a flowchart explaining the processing steps of a scaling operation of a motion vector.

FIG. 22 is a flowchart showing the processing steps of a scaling operation of a motion vector in step S3415 of FIG. 20.

An inter-picture distance td is derived by subtracting the POC of a reference picture that corresponds to the reference index refIdxCol referred to in the list ListCol of the prediction block colPU from the POC of the picture colPic located at a different point of time (step S3601). If the POC of the reference picture referred to in the list ListCol of the prediction block colPU comes before the picture colPic located at a different point of time in display order, the inter-picture distance td becomes a positive value, and if the POC of the reference picture referred to in the list ListCol of the prediction block colPU comes after the picture colPic located at a different point of time in display order, the inter-picture distance td becomes a negative value.

$td$=(POC of picture colPic at a different point of time)−(POC of reference picture referred to in list LostCol of prediction block colPU)

The inter-picture distance tb is derived by subtracting the POC of a reference picture that corresponds to the LX reference index of the temporal merge candidate derived in step S102 of FIG. 14 from the POC of the current picture subject to coding or decoding (step S3602). If a reference picture referred to in the list LX of the current picture subject to coding or decoding comes before the current picture subject to coding or decoding, the inter-picture distance tb becomes a positive value, and if the reference picture referred to in the list LX of the current picture subject to coding or decoding comes after the current picture subject to coding or decoding, the inter-picture distance tb becomes a negative value.

$tb$=(POC of current picture subject to coding or decoding)−(POC of reference picture corresponding to $LX$ reference index of temporal merge candidate)

Subsequently, the inter-picture distances td and tb are compared with each other (step S3603), and if the inter-picture distances td and tb are equal to each other (YES in step S3603), the LX motion vector mvLXCol of the temporal merge candidate is set to be the same value as the motion vector mvCol (step S3604), and the scaling operation process is ended.

$mvLX$Col=$mv$Col

On the other hand, if the inter-picture distances td and tb are not equal to each other (NO in step S3603), the scaling operation process is performed by multiplying mvCol by a scaling coefficient tb/td according to the following expression (step S3605) so as to derive the LX motion vector mvLXCol of the temporal merge candidate that has been scaled.

$mvLX$Col=$tb/td*mv$Col

Figure 23:
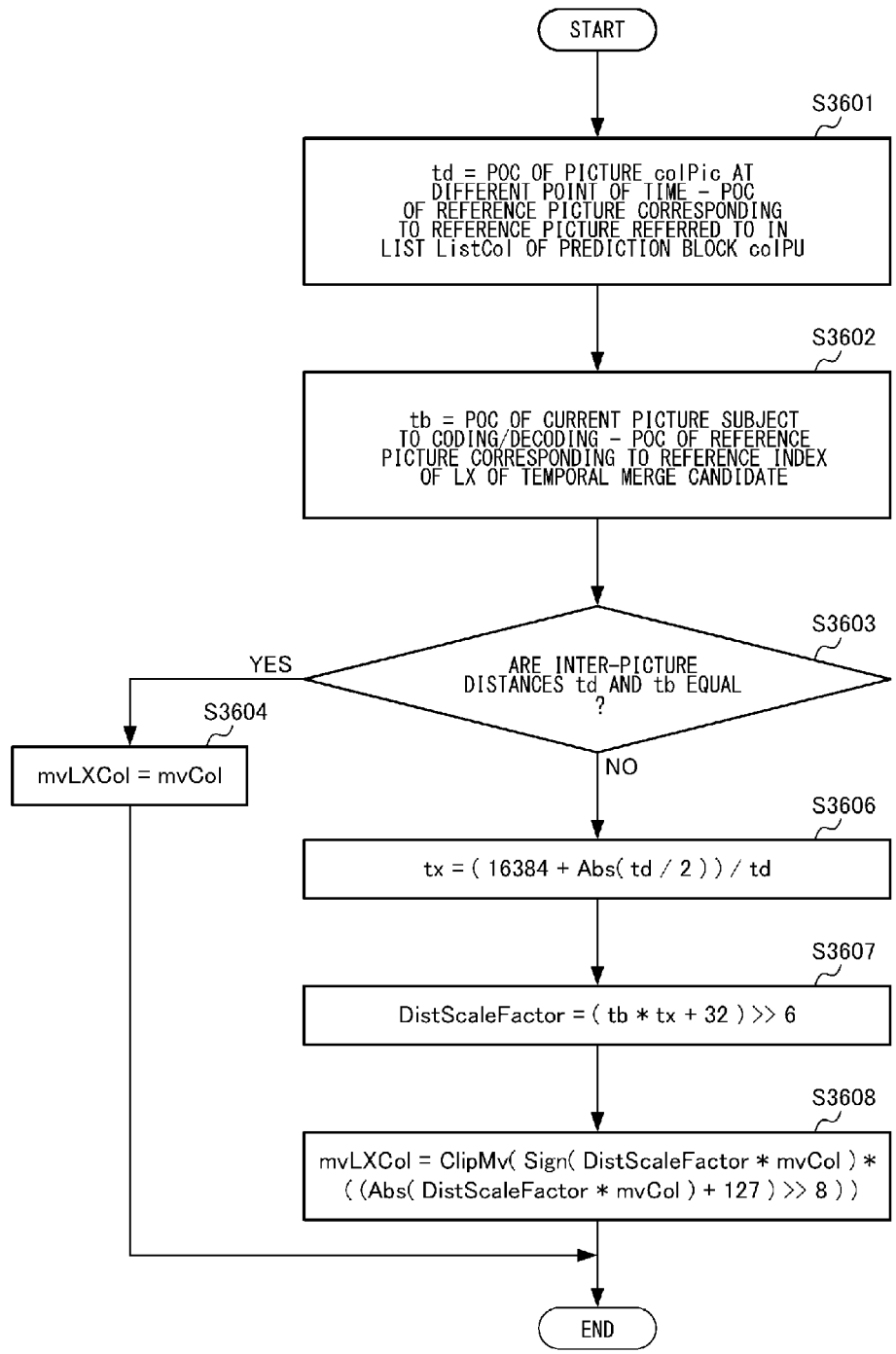
FIG. 23 is a flowchart explaining the processing steps of a scaling operation of a motion vector.

An example is shown in FIG. 23 for performing the scaling operation in step S3605 by an integer precision operation. Processes insteps S3606-S3608 shown in FIG. 23 correspond to the process in step S3605 shown in FIG. 22.

First, inter-picture distances td and tb are derived in the same way as in the flowchart of FIG. 22 (step S3601, step S3602).

Subsequently, the inter-picture distances td and tb are compared with each other (step S3603), and if the inter-picture distances td and tb are equal to each other (YES in step S3603), the LX motion vector mvLXCol of the temporal merge candidate is set to be the same value as the motion vector mvCol in the same way as in the flowchart of FIG. 22 (step S3604), and the scaling operation process is ended.

$mvLX$Col=$mv$Col

On the other hand, if the inter-picture distances td and tb are not equal to each other (NO in step S3603), a variable tx is derived according to the following expression (step S3606).

$tx$=(16384+Abs($td$/2))/$td$

Subsequently, a scaling coefficient DistScaleFactor is derived according to the following expression (step S3607).

DistScaleFactor=($tb*tx$+32)>>6

Subsequently, a scaled LX motion vector mvLXCol of the temporal merge candidate is derived according to the following expression (step S3608).

$mvLX$Col=Clip$Mv$(Sign(DistScaleFactor*$mv$Col)*
    ((Abs(DistScaleFactor*$mv$Col)+127)>>8))

Figure 24:
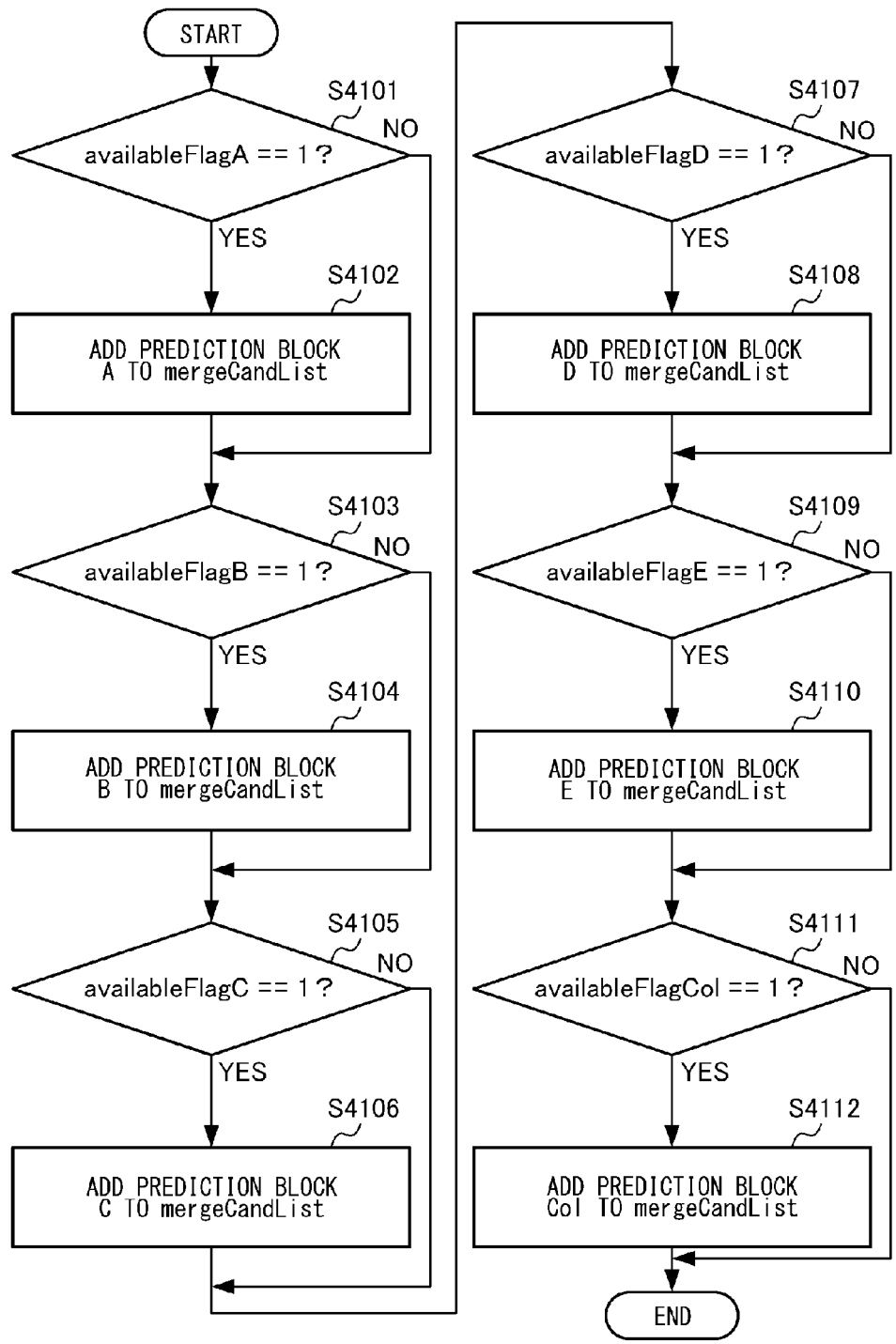
FIG. 24 is a flowchart explaining the processing steps of adding a merge candidate to the merge candidate list in the merge mode.

A detailed explanation will be now given of a method of adding a merge candidate in step S104 of FIG. 14 to the merge candidate list. FIG. 24 is a flowchart showing the processing steps of adding a merge candidate to the merge candidate list. According to the scheme described herein, the code size of a merge index merge_idx[x0] [y0] is reduced by adding the motion vector predictor candidates to the merge candidate list mergeCandList in the order of priority. By locating elements with higher priority toward the top of the merge candidate list, the code size is reduced. For example, if the number of elements in the merge candidate list mergeCandList is 5, the code size required to define an index 0 will be 1 bit by representing the index 0 in the merge candidate list as "0," the index 1 as "10," the index 2 as "110," the index 3 as "1110," and the index 4 as "1110." By adding an element with the highest frequency of occurrence at the index 0, the code size is reduced.

The merge candidate list mergeCandList is built as a list. The merge candidate list is provided with a storage area for storing, as elements, a merge index indicating the location inside the merge candidate list and a merge candidate corresponding to the index. Merge indices start with 0. The storage area for the merge candidate list mergeCandList stores a merge candidate. In the following description of the steps, a merge candidate prediction block added to the merge candidate list mergeCandList at the merge index i will be denoted by mergeCandList[i] so as to distinguish it from the merge candidate list mergeCandList by using array notation.

First, if availableFlagA is 1 (YES in step S4101), a merge candidate A is added at the top of the merge candidate listmergeCandList (step S4102). Subsequently, if availableFlagB is 1 (YES in step S4103), a merge candidate B is added at the end of the merge candidate list mergeCandList (step S4104). Subsequently, if availableFlagC is 1 (YES in step S4105), a merge candidate C is added at the end of the merge candidate list mergeCandList (step S4106). Subsequently, if availableFlagD is 1 (YES in step S4107), a merge candidate D is added at the end of the merge candidate list mergeCandList (step S4108). Subsequently, if availableFlagE is 1 (YES in step S4109), a merge candidate E is added at the end of the merge candidate list mergeCandList (step S4110). Subsequently, if availableFlagCol is 1 (YES in step S4111), a merge candidate Col is added at the end of the merge candidate list mergeCandList (step S4112).

In the merge mode, the prediction block A neighboring to the left and the prediction block B neighboring above are likely to undergo similar motion as the prediction block subject to coding or decoding. Accordingly, if the inter prediction information of the prediction blocks A and B can be derived, the merge candidates A and B are added toward the top of the merge candidate list in preference to the other prediction blocks C, D, E, and Col.

In FIG. 12, the coding information selection unit 137 of the inter prediction information derivation unit 104 of the moving picture coding device selects a merge candidate from merge candidates added to the merge candidate list and supplies the merge index and the inter prediction information of the merge candidate corresponding to the merge index to the motion compensation prediction unit 105.

For selection of a merge candidate, a similar method as used in the prediction method decision unit 107 may be used. The code size of the coding information and a residual signal and the amount of distortion between the prediction picture signal and the picture signal are derived for each merge candidate, and a merge candidate with the smallest code size and coding distortion is identified. Entropy coding of a syntax element merge_idx of a merge index, which is coding information in the merge mode, is performed for each merge candidate, and the code size of the coding information is derived. Further, the code size of a prediction residual signal is derived for each merge candidate. The prediction residual signal is obtained by coding a prediction residual signal between the prediction picture signal derived from performing motion compensation in accordance with the inter prediction information of each merge candidate using the method performed in the motion compensation prediction unit 105 and the picture signal subject to coding supplied from the picture memory 101. The total generated code size is determined by deriving a sum of the code size of the coding information, i.e., the merge index, and the code size of the prediction residual signal. The derived size is defined as an evaluation value.

The prediction residual signal thus coded is then decoded for evaluation as to the amount of distortion. Coding distortion is derived as a ratio indicating an error from the original picture signal produced as a result of coding. By comparing the total generated code size and coding distortion of a given merge candidate with those of another, the coding information with a small code size and coding distortion is identified. The merge index corresponding to the identified coding information is coded as a flag merge_idx defined in the second syntax pattern for each prediction block. While it is desirable to derive the generated code size by simulating the coding steps, the generated code size may be determined by approximate derivation or rough estimation.

Meanwhile, referring to FIG. 13, the coding information selection unit 237 of the inter prediction information derivation unit 205 of the moving picture coding device selects a merge candidate corresponding to the supplied merge index from merge candidates added to the merge candidate list, supplies the inter prediction information of the merge candidate to the motion compensation prediction unit 206, and stores the inter prediction information in the coding information storage memory 210.

In the present embodiment described above, the final number of merge candidates finalNumMergeCand, which is added to the merge candidate list mergeCandList in units of slices, is set. An explanation will be given hereinbelow regarding the present embodiment dividing the embodiment into some exemplary embodiments. First, an explanation will be given regarding the first exemplary embodiment of the present embodiment. In the first exemplary embodiment of the present embodiment, the final number of merge candidates finalNumMergeCand that is common on the coding side and the decoding side is defined for each slice type. As in the case of MPEG-4 AVC/H.264 or the like, devices, software, or bitstreams conforming to the present embodiment may mainly define a profile that indicates a group of processing functions defined according to a purpose or application and a level that indicates processing ability such as a processing load, a used memory amount, and the like that are also related to an image size and a frame rate, and exhibit performance the device or the software and performance necessary for decoding the bitstreams by the profile and the level. The value of the final number of merge candidates finalNumMergeCand may be defined for each slice type according to either one of the profile and the level or according to a combination of the profile and the level. Alternatively, the value of the final number of merge candidates finalNumMergeCand may be defined for each slice type regardless of the profile and the level. For example, in a profile configured of a simple function of coding or decoding using only an I slice and a P slice, the final number of merge candidates finalNumMergeCand of the P slice is defined to be 3. In a profile configured of a complicated function, with a high coding efficiency, of coding or decoding using a B slice in addition to an I slice and a P slice, both the final number of merge candidates finalNumMergeCand of the P slice and the final number of merge candidates finalNumMergeCand of the B slice may be defined to be the same number of 5. However, by defining the final number of merge candidates finalNumMergeCand of the P slice to be 3, which is smaller than the final number of merge candidates finalNumMergeCand of the B slice, the code size of the merge index of the P slice can be suppressed to be small, and the processing volume related to coding and decoding of the merge index can be reduced.

If the slice type is a P slice where only L0 prediction is available, merge candidates that are added to a merge candidate list are difficult to obtain since it is more difficult to select inter prediction compared to a B slice where L0 prediction, L1 prediction, and bi-prediction are available, and the merge candidates are likely to have the same inter prediction information. Thus, the number of the merge candidates added to the merge candidate list is likely to become small. Therefore, in a P slice, even if the final number of merge candidates finalNumMergeCand is set to be smaller than that in a B slice, the coding efficiency does not become lowered as much as in the B slice. Thus, the code size of the merge index thereof can be suppressed to be small, and the processing volume related to coding and decoding of the merge index can be reduced. One of the reasons for performing coding or decoding not by a B slice with a high coding efficiency but by a P slice is because the processing volume is smaller in the P slice. In particular, a profile configured of a simple function of coding or decoding using only an I slice and a P slice is set to perform coding or decoding with small processing volume, an effect obtained by setting the final number of merge candidates finalNumMergeCand of the P slice to be small so as to reduce the processing volume related to coding or decoding of a merge index is large.

Figure 25:
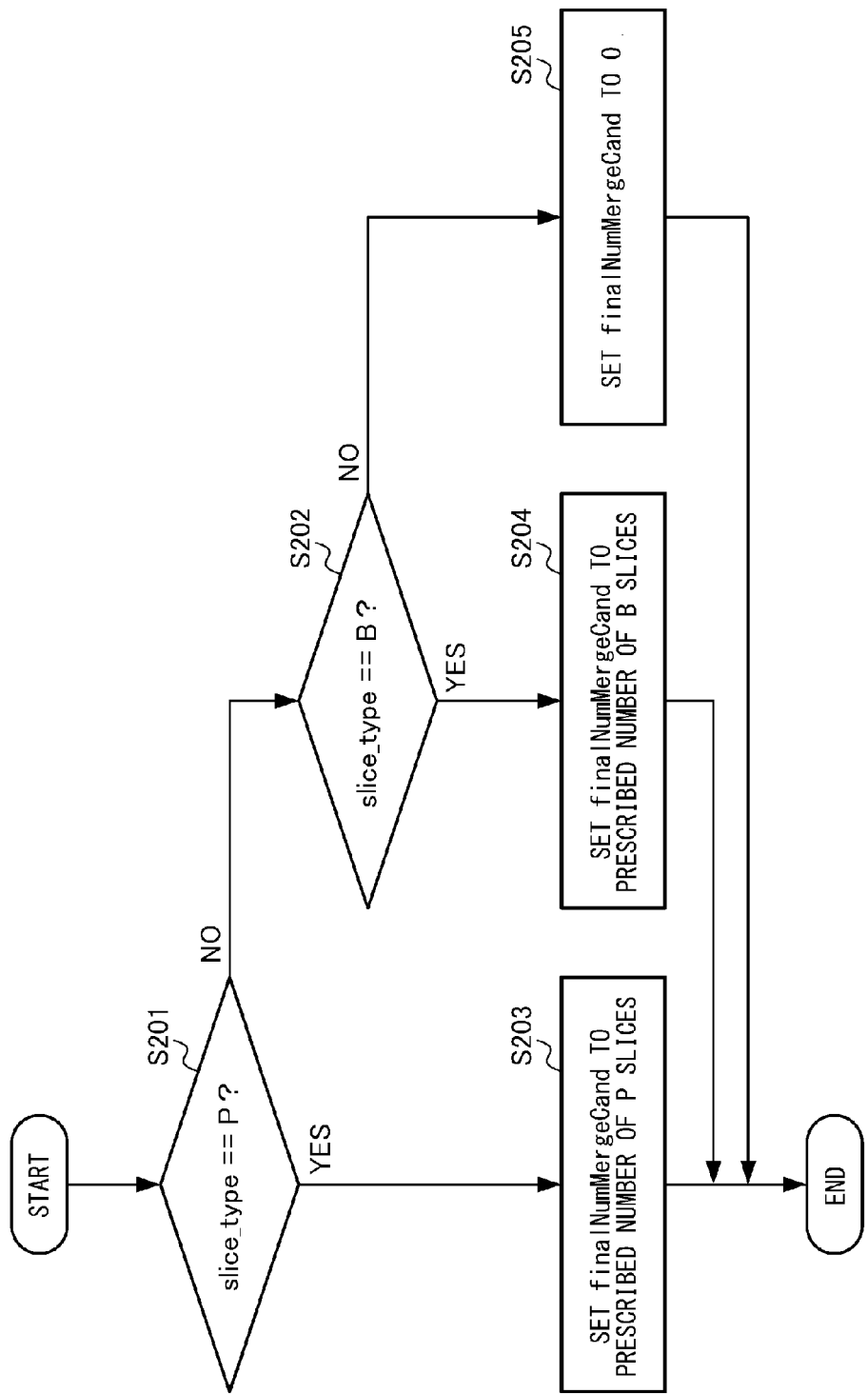
FIG. 25 is a flowchart explaining the processing steps of setting the final number of merge candidates finalNumMergeCand that is common on the coding side and on the decoding side according to a method described in a first exemplary embodiment.

FIG. 25 is a flowchart explaining the processing steps of setting the final number of merge candidates finalNumMergeCand that is common on the coding side and on the decoding side according to the method described in the first exemplary embodiment of the present embodiment. The final number of merge candidates finalNumMergeCand is set by the header information setting unit 117 in the coding device and is set by the first bitstream decoding unit 212 in the decoding device. If the slice type slice_type is a P slice (YES in step S201 of FIG. 25), the final number of merge candidates finalNumMergeCand is set to be a defined number of the P slice (3 in the present embodiment) (step S203 of FIG. 25). If the slice type slice_type is a B slice (NO in step S201, YES in step S202 of FIG. 25), the final number of merge candidates finalNumMergeCand is set to be a defined number of the B slice (5 in the present embodiment) (step S204 of FIG. 25). If the slice type slice_type is an I slice (NO in step S201, NO in step S202 of FIG. 25), the final number of merge candidates finalNumMergeCand is set to be 0 (step S205 of FIG. 25).

As in the case of the final number of merge candidates finalNumMergeCand, the upper limit value of the number of spatial merge candidates maxNumSpatialMergeCand may be defined for each slice type according to either one of the profile and the level or according to a combination of the profile and the level. Alternatively, the upper limit value of the number of spatial merge candidates maxNumSpatialMergeCand may be defined for each slice type regardless of the profile and the level. In consideration of the coding efficiency and the processing volume, the upper limit value of the number of spatial merge candidates maxNumSpatialMergeCand is defined to be a large value in the case where the coding efficiency is given weight (profile, level, or slice type), and the upper limit value of the number of spatial merge candidates maxNumSpatialMergeCand is defined to be a small value in the case where the processing volume is given weight.

An explanation will now be given regarding the second exemplary embodiment of the present embodiment. In the second exemplary embodiment of the present embodiment, as shown in an example of the syntax rule, which is a rule common in coding and decoding of a bitstream of FIG. 26, a syntax element num_merge_cand indicating the final number of merge candidates finalNumMergeCand is set in a slice header in unit of slices. The upper limit value of the final number of merge candidates is defined for each slice type. The upper limit value of the final number of merge candidates may be defined for each slice type according to a combination of the profile and the level. Alternatively, the upper limit value of the final number of merge candidates may be defined for each slice type regardless of the profile and the level. For example, in a profile configured of a simple function of coding or decoding using only an I slice and a P slice, the upper limit value of the final number of merge candidates of the P slice is defined to be 3. In a profile configured of a complicated function, with a high coding efficiency, of coding or decoding using a B slice in addition to an I slice and a P slice, both the upper limit value of the final number of merge candidates of the P slice and the upper limit value of the final number of merge candidates of the B slice can be defined to be the same number of 5 or the upper limit value of the final number of merge candidates of the P slice may be defined to be smaller than the upper limit value of the final number of merge candidates of the B slice.

Figure 27:
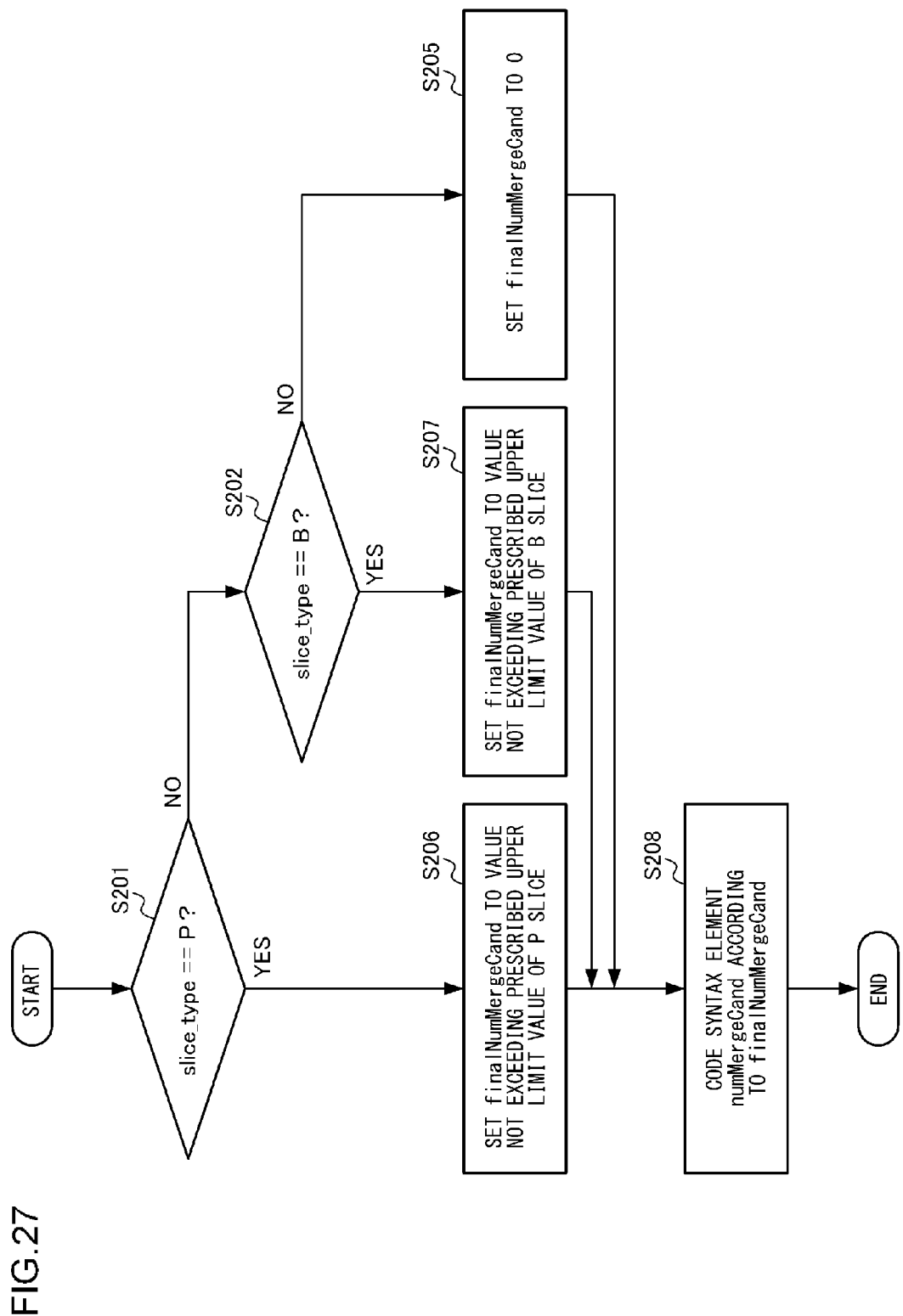
FIG. 27 is a flowchart explaining the processing steps of setting the final number of merge candidates finalNumMergeCand on the coding side according to a method described in a second exemplary embodiment.
Figure 28:
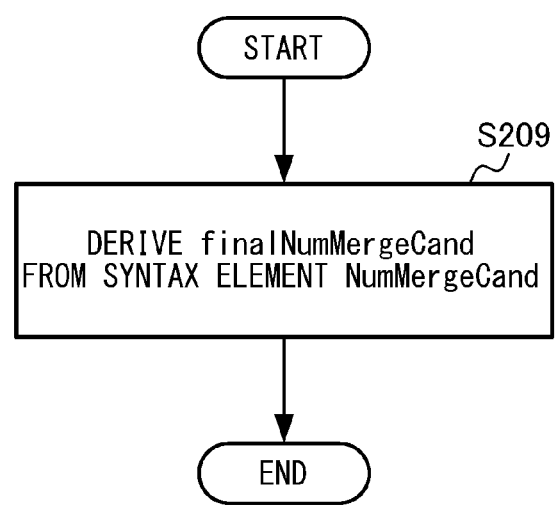
FIG. 28 is a flowchart explaining the processing steps of setting the final number of merge candidates finalNumMergeCand on the decoding side according to the method described in the second exemplary embodiment.
Figure 29:
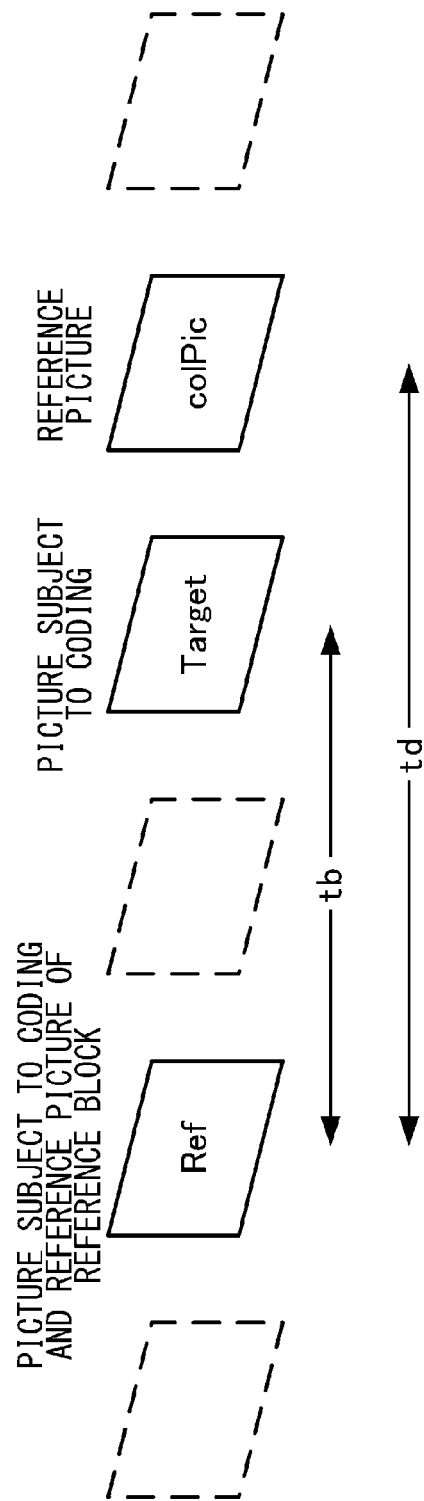
FIG. 29 is a diagram explaining a conventional temporal direct mode in MPEG-4 AVC/H.264.

FIG. 27 is a flowchart explaining the processing steps of setting the final number of merge candidates finalNumMergeCand on the coding side according to the method described in the second exemplary embodiment of the present embodiment. FIG. 28 is a flowchart explaining the processing steps of setting the final number of merge candidates finalNumMergeCand on the decoding side according to the method described in the second exemplary embodiment of the present embodiment. The final number of merge candidates finalNumMergeCand is set by the header information setting unit 117 in the coding device and is set by the first bitstream decoding unit 212 in the decoding device. If the slice type slice type is a P slice on the coding side (YES in step S201 of FIG. 27), the final number of merge candidates finalNumMergeCand is set to be the same as a defined upper limit value of the P slice or a value that does not exceed the upper limit value (3 in the present embodiment) (step S206 of FIG. 27). If the slice type slice type is a B slice (NO in step S201, YES in step S202 of FIG. 27), the final number of merge candidates finalNumMergeCand is set to be the same as a defined upper limit value of the B slice or is set to be a value that does not exceed the upper limit value (5 in the present embodiment)(step S207 of FIG. 27). If the slice type slice_type is an I slice (NO in step S201, NO in step S202 of FIG. 27), the final number of merge candidates finalNumMergeCand is set to be 0 (step S205 of FIG. 27). Further, a syntax element numMergeCand indicating the final number of merge candidates finalNumMergeCand set in units of slices is entropy coded (step S208 of FIG. 27). The bitstream is decoded on the decoding side so as to derive the final number of merge candidates finalNumMergeCand from the syntax element numMergeCand (S209 of FIG. 28).

According to the value of the syntax element max_num_spatial_merge_cand, the upper limit value of the number of spatial merge candidates maxNumSpatialMergeCand can be defined along with the final number of merge candidates finalNumMergeCand. In this case, the final number of merge candidates finalNumMergeCand and the upper limit value of the number of spatial merge candidates maxNumSpatialMergeCand may be defined to have the same value or different values. In consideration of the coding efficiency and the processing volume according to the profile, the level, or the slice type, the upper limit value of the number of spatial merge candidates maxNumSpatialMergeCand is defined to be a large value in the case where the coding efficiency is given weight, and the upper limit value of the number of spatial merge candidates maxNumSpatialMergeCand is defined to be a small value in the case where the processing volume is given weight.

Alternatively, as shown in FIG. 26, a syntax element max_num_spatial_merge_cand indicating the upper limit value of the spatial merge candidates can be set to a slice header in unit of slices. The syntax element max_num_spatial_merge_cand is coded on the coding side, and a decoding process is performed based on the upper limit value of the number of spatial merge candidates maxNumSpatialMergeCand determined by the value of the syntax element max_num_spatial_merge_cand obtained by decoding the bitstream on the decoding side. In this case, setting the upper limit value of the number of spatial merge candidates maxNumSpatialMergeCand within the range of the coding-side processing ability on the coding side allows for the control of the processing volume for the derivation of special merge candidates and the processing volume for the decision on whether merge candidates are identical.

The bitstream of moving pictures output from the moving picture coding device according to any of the embodiments described above has a specific data format so that it can be decoded in accordance with the coding method used in the embodiments. The moving picture decoding device compatible with the moving picture coding device is capable of decoding the bitstream of the specific data format.

If a wired or wireless network is used to exchange bitstreams between the moving picture coding device and the moving picture decoding device, the bitstream may be converted into a data format suited to the mode of transmission over a communication channel and be transmitted accordingly. In this case, there is provided a moving picture transmitting device for converting the bitstreams output from the moving picture coding device into coded data of a data format suited to the mode of transmission over the communication channel and for transmitting the bitstreams over the network, and a moving picture receiving device for receiving the coded data over the network to reconstruct the bitstreams and supplying the recovered bitstreams to the moving picture decoding device.

The moving picture transmitting device includes a memory for buffering bitstreams output from the moving picture coding device, a packet processing unit for packetizing the bitstreams, and a transmitting unit for transmitting the packetized bitstreams over the network. The moving picture receiving device includes a receiving unit for receiving the packetized coded data over the network, a memory for buffering the received coded data, and a packet processing unit for subjecting the coded data to a packet process so as to generate bitstreams and providing the generated bitstreams to the moving picture decoding device.

The above-described processes related to coding and decoding can of course be implemented by hardware-based apparatus for transmission, storage, or reception. Alternatively, the processes can be implemented by firmware stored in a read-only memory (ROM), a flash memory, etc., or by software on a computer, etc. The firmware program or the software program may be made available on, for example, a computer readable recording medium. Alternatively, the programs may be made available from a server via a wired or wireless network. Still alternatively, the programs may be made available in the form of data transmission over terrestrial or satellite digital broadcast systems.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

[Item 1]

A moving picture coding device adapted to code, by using inter prediction, moving pictures in units of blocks obtained by partitioning each picture, comprising:

a prediction information derivation unit configured to derive inter prediction information candidates from inter prediction information of coded prediction blocks neighboring a prediction block subject to coding within the same picture as the prediction block subject to coding and inter prediction information of a prediction block in a coded picture that is different from the prediction block subject to coding;

a decision unit configured to determine an inter prediction information candidate to be used for inter prediction of the prediction block subject to coding from the inter prediction information candidates that have been derived;

a first coding unit configured to code a syntax element that indicates the number of the inter prediction information candidates; and a second coding unit configured to code an index that indicates the inter prediction information candidate determined by the decision unit, based on the number of the inter prediction information candidates.

[Item 2]

The moving picture coding device according to Item 1, wherein the maximum value indicated by the index is the value of (the number of the inter prediction information candidates−1).

[Item 3]

A moving picture coding device adapted to code moving pictures in units of blocks obtained by partitioning each picture of the moving pictures, by using motion compensation prediction, comprising:

a prediction information derivation unit configured to derive inter prediction information candidates from inter prediction information of prediction blocks neighboring a prediction block subject to coding or a prediction block that exists at the same position as or near a prediction block subject to coding in a coded picture located at a point of time different from the prediction block subject to coding;

a candidate number control unit configured to limit the number of the inter prediction information candidates according to at least either one of a profile that indicates a group of processing functions and a level that indicates decoding processing ability;

a motion compensation prediction unit configured to select a single inter prediction information candidate from the limited number of the inter prediction information candidates and to perform inter prediction of the prediction block subject to coding by the inter prediction information candidate thus selected; and a coding unit configured to code a syntax element that indicates the number of inter prediction information candidates used to limit the number of the candidates.

[Item 4]

A moving picture coding method adapted to code, by using inter prediction, moving pictures in units of blocks obtained by partitioning each picture, comprising:

deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding;

determining an inter prediction information candidate to be used for inter prediction of the prediction block subject to coding from the inter prediction information candidates that have been derived;

coding a syntax element that indicates the number of the inter prediction information candidates; and coding an index that indicates the inter prediction information candidate determined by the determination, based on the number of the inter prediction information candidates.

[Item 5]

The moving picture coding method according to Item 4, wherein the maximum value indicated by the index is the value of (the number of the inter prediction information candidates−1).

[Item 6]

A moving picture coding program embedded on a non-transitory computer-readable recording medium and adapted to code, by using inter prediction, moving pictures in units of blocks obtained by partitioning each picture, the program comprising:

deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding;

determining an inter prediction information candidate to be used for inter prediction of the prediction block subject to coding from the inter prediction information candidates that have been derived;

coding a syntax element that indicates the number of the inter prediction information candidates; and coding an index that indicates the inter prediction information candidate determined by the determination, based on the number of the inter prediction information candidates.

[Item 7]

The moving picture coding program according to Item 6, wherein the maximum value indicated by the index is the value of (the number of the inter prediction information candidates−1).

[Item 8]

A transmitting device comprising:

a packet processing unit configured to packetize a bitstream coded by a moving picture coding method adapted to code, by using inter prediction, moving pictures in units of blocks obtained by partitioning each picture so as to obtain coded data; and a transmitting unit configured to transmit the coded data that has been packetized, wherein the moving picture coding method includes:

deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding;

determining an inter prediction information candidate to be used for inter prediction of the prediction block subject to coding from the inter prediction information candidates that have been derived;

coding a syntax element that indicates the number of the inter prediction information candidates; and coding an index that indicates the inter prediction information candidate determined by the determination, based on the number of the inter prediction information candidates.

[Item 9]

The transmitting device according to Item 8, wherein the maximum value indicated by the index is the value of (the number of the inter prediction information candidates−1).

[Item 10]

A transmitting method comprising:

packetizing a bitstream coded by a moving picture coding method adapted to code, by using inter prediction, moving pictures in units of blocks obtained by partitioning each picture so as to obtain coded data; and transmitting the coded data that has been packetized, wherein the moving picture coding method includes:

deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding;

determining an inter prediction information candidate to be used for inter prediction of the prediction block subject to coding from the inter prediction information candidates that have been derived;

coding a syntax element that indicates the number of the inter prediction information candidates; and coding an index that indicates the inter prediction information candidate determined by the determination, based on the number of the inter prediction information candidates.

[Item 11]

The transmitting method according to Item 10, wherein the maximum value indicated by the index is the value of (the number of the inter prediction information candidates−1).

[Item 12]

A transmitting program embedded in a non-transitory computer readable recording medium, comprising:

packetizing a bitstream coded by a moving picture coding method adapted to code, by using inter prediction, moving pictures in units of blocks obtained by partitioning each picture so as to obtain coded data; and transmitting the coded data that has been packetized, wherein the moving picture coding method includes:

deriving inter prediction information candidates from inter prediction information of coded prediction blocks neighboring a prediction block subject to coding within the same picture as the prediction block subject to coding and inter prediction information of a prediction block in a coded picture that is different from the prediction block subject to coding;

determining an inter prediction information candidate to be used for inter prediction of the prediction block subject to coding from the inter prediction information candidates that have been derived;

coding a syntax element that indicates the number of the inter prediction information candidates; and coding an index that indicates the inter prediction information candidate determined by the determination, based on the number of the inter prediction information candidates.

[Item 13]

The transmitting program according to Item 12, wherein the maximum value indicated by the index is the value of (the number of the inter prediction information candidates−1).

[Item 14]

A moving picture decoding device adapted to decode a bitstream in which moving pictures are coded, by using inter prediction, in units of blocks obtained by partitioning each picture, comprising:

a prediction information derivation unit configured to derive inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding;

a first decoding unit configured to decode a syntax element that indicates the number of the inter prediction information candidates so as to derive the number of the inter prediction information candidates;

a second decoding unit configured to decode an index that indicates an inter prediction information candidate to be used for inter prediction of the prediction block subject to decoding based on the number of the inter prediction information candidates derived by the first decoding unit; and a selection unit configured to select the inter prediction information candidate indicated by the index from the inter prediction information candidates derived by the prediction information derivation unit.

[Item 15]

The moving picture decoding device according to Item 14, wherein the maximum value indicated by the index is the value of (the number of the inter prediction information candidates−1).

[Item 16]

A moving picture decoding device adapted to decode a bitstream in which moving pictures are coded in units of blocks obtained by partitioning each picture of the moving pictures, by using motion compensation prediction, comprising:

a prediction information derivation unit configured to derive inter prediction information candidates from inter prediction information of prediction blocks neighboring a prediction block subject to decoding or a prediction block that exists at the same position as or near a prediction block subject to decoding in a decoded picture located at a point of time different from the prediction block subject to decoding;

a first decoding unit configured to decode a syntax element that indicates the number of the inter prediction information candidates so as to derive the number of the inter prediction information candidates;

a candidate number control unit configured to limit the number of the inter prediction information candidates by using the number of the inter prediction information candidates derived by the first decoding unit;

a second decoding unit configured to decode an index that indicates the inter prediction information candidate, which serves as inter prediction information of the prediction block subject to decoding, based on the number of the inter prediction information candidates derived by the first decoding unit; and a motion compensation prediction unit configured to select the inter prediction information candidate indicated by the index that has been decoded from the limited number of the inter prediction information candidates and to perform inter prediction of the prediction block subject to decoding by the inter prediction information candidate thus selected.

[Item 17]

A moving picture decoding method adapted to decode a bitstream in which moving pictures are coded, by using inter prediction, in units of blocks obtained by partitioning each picture, comprising:

deriving inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding;

decoding a syntax element that indicates the number of the inter prediction information candidates so as to derive the number of the inter prediction information candidates;

decoding an index that indicates an inter prediction information candidate to be used for inter prediction of the prediction block subject to decoding based on the number of the inter prediction information candidates derived by the first decoding; and selecting the inter prediction information candidate indicated by the index from the inter prediction information candidates derived by the deriving of the inter prediction information candidates.

[Item 18]

The moving picture decoding method according to Item 17, wherein the maximum value indicated by the index is the value of (the number of the inter prediction information candidates−1).

[Item 19]

A moving picture decoding program embedded on a non-transitory computer-readable recording medium and adapted to decode a bitstream in which moving pictures are coded, by using inter prediction, in units of blocks obtained by partitioning each picture, comprising:

deriving inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding;

decoding a syntax element that indicates the number of the inter prediction information candidates so as to derive the number of the inter prediction information candidates;

decoding an index that indicates an inter prediction information candidate to be used for inter prediction of the prediction block subject to decoding based on the number of the inter prediction information candidates derived by the first decoding; and selecting the inter prediction information candidate indicated by the index from the inter prediction information candidates derived by the deriving of the inter prediction information candidates.

[Item 20]

The moving picture decoding program according to Item 19, wherein the maximum value indicated by the index is the value of (the number of the inter prediction information candidates−1).

[Item 21]

A receiving device adapted to receive a bitstream in which moving pictures are coded and to decode the received bitstream, comprising:

a receiving unit configured to receive coded data obtained by packetizing the bitstream in which moving pictures are coded, by using inter prediction, in units of blocks obtained by partitioning each picture;

a reconstruction unit configured to reconstruct an original bitstream by processing packets of the coded data that has been received;

a prediction information derivation unit configured to derive inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding;

a first decoding unit configured to decode a syntax element that indicates the number of the inter prediction information candidates from the bitstream that has been reconstructed so as to derive the number of the inter prediction information candidates;

a second decoding unit configured to decode an index that indicates an inter prediction information candidate to be used for inter prediction of the prediction block subject to decoding based on the number of the inter prediction information candidates derived by the first decoding unit from the bitstream that has been reconstructed; and a selection unit configured to select the inter prediction information candidate indicated by the index from the inter prediction information candidates derived by the prediction information derivation unit.

[Item 22]

The receiving device according to Item 21, wherein the maximum value indicated by the index is the value of (the number of the inter prediction information candidates−1).

[Item 23]

A receiving method adapted to receive a bitstream in which moving pictures are coded and to decode the received bitstream, comprising:

receiving coded data obtained by packetizing the bitstream in which moving pictures are coded, by using inter prediction, in units of blocks obtained by partitioning each picture;

reconstructing an original bitstream by processing packets of the coded data that has been received;

deriving inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding;

decoding a syntax element that indicates the number of the inter prediction information candidates from the bitstream that has been reconstructed so as to derive the number of the inter prediction information candidates;

decoding an index that indicates an inter prediction information candidate to be used for inter prediction of the prediction block subject to decoding based on the number of the inter prediction information candidates derived by the first decoding from the bitstream that has been reconstructed; and selecting the inter prediction information candidate indicated by the index from the inter prediction information candidates derived by the deriving of the inter prediction information candidates.

[Item 24]

The receiving method according to Item 23, wherein the maximum value indicated by the index is the value of (the number of the inter prediction information candidates−1).

[Item 25]

A receiving program embedded on a non-transitory computer-readable recording medium and adapted to receive a bitstream in which moving pictures are coded and to decode the received bitstream, comprising:

receiving coded data obtained by packetizing the bitstream in which moving pictures are coded, by using inter prediction, in units of blocks obtained by partitioning each picture;

reconstructing an original bitstream by processing packets of the coded data that has been received;

deriving inter prediction information candidates from inter prediction information of decoded prediction blocks neighboring a prediction block subject to decoding within the same picture as the prediction block subject to decoding and inter prediction information of a prediction block in a decoded picture different from that of the prediction block subject to decoding;

decoding a syntax element that indicates the number of the inter prediction information candidates from the bitstream that has been reconstructed so as to derive the number of the inter prediction information candidates;

decoding an index that indicates an inter prediction information candidate to be used for inter prediction of the prediction block subject to decoding based on the number of the inter prediction information candidates derived by the first decoding from the bitstream that has been reconstructed; and selecting the inter prediction information candidate indicated by the index from the inter prediction information candidates derived by the deriving of the inter prediction information candidates.

[Item 26]

The receiving program according to Item 25, wherein the maximum value indicated by the index is the value of (the number of the inter prediction information candidates−1).

What is claimed is:

1. A moving picture decoding device adapted to decode a bitstream in which moving pictures are coded in units of blocks obtained by partitioning each picture of the moving pictures, comprising:

a first bitstream decoding unit configured to set the number of merge candidates;

a second bitstream decoding unit configured to decode information indicating indices of the merge candidates;

a spatial merge candidate generation unit configured to derive spatial merge candidates from a first predefined number of blocks neighboring a prediction block subject to decoding;

a temporal merge candidate generation unit configured to derive a temporal merge candidate from a block that exists at the same position as or near a prediction block subject to decoding in a decoded picture that is different from the prediction block subject to decoding;

a merge candidate addition unit configured to add the spatial merge candidates and the temporal merge candidates to a merge candidate list;

a coding information selection unit configured to select a merge candidate from the merge candidates added to the merge list; and a motion compensation prediction unit configured to perform inter prediction of the prediction block subject to decoding by the merge candidate thus selected, wherein the second bitstream decoding unit derives the indices of the merge candidates based on the number of the merge candidates; and the spatial merge candidate generation unit stops deriving the spatial merge candidates when the number of the derived spatial merge candidates reaches a second predefined number smaller than the first predefined number.

2. A moving picture decoding method adapted to decode a bitstream in which moving pictures are coded in units of blocks obtained by partitioning each picture of the moving pictures, comprising:

a first bitstream decoding step of setting the number of merge candidates;

a second bitstream decoding step of decoding information indicating indices of the merge candidates;

a spatial merge candidate generation step of deriving spatial merge candidates from a first predefined number of blocks neighboring a prediction block subject to decoding;

a temporal merge candidate generation step of deriving a temporal merge candidate from a block that exists at the same position as or near a prediction block subject to decoding in a decoded picture that is different from the prediction block subject to decoding;

a merge candidate addition step of adding the spatial merge candidates and the temporal merge candidates to a merge candidate list;

a coding information selection step of selecting a merge candidate from the merge candidates added to the merge list; and a motion compensation prediction step of performing inter prediction of the prediction block subject to decoding by the merge candidate thus selected, wherein the second bitstream decoding step derives the indices of the merge candidates based on the number of the merge candidates; and the spatial merge candidate generation step stops deriving spatial merge candidates when the number of the derived spatial merge candidates reaches a second predefined number smaller than the first predefined number.

3. A non-transitory computer-readable recording medium having embedded thereon a moving picture decoding program adapted to decode a bitstream in which moving pictures are coded in units of blocks obtained by partitioning each picture of the moving pictures, the moving picture decoding program comprising:

a first bitstream decoding step of setting the number of merge candidates;

a second bitstream decoding step of decoding information indicating indices of the merge candidates;

a spatial merge candidate generation step of deriving spatial merge candidates from a first predefined number of blocks neighboring a prediction block subject to decoding;

a temporal merge candidate generation step of deriving a temporal merge candidate from a block that exists at the same position as or near a prediction block subject to decoding in a decoded picture that is different from the prediction block subject to decoding;

a merge candidate addition step of adding the spatial merge candidates and the temporal merge candidates to a merge candidate list;

a coding information selection step of selecting a merge candidate from the merge candidates added to the merge list; and a motion compensation prediction step of performing inter prediction of the prediction block subject to decoding by the merge candidate thus selected, wherein the second bitstream decoding step derives the indices of the merge candidates based on the number of the merge candidates; and the spatial merge candidate generation step stops deriving the spatial merge candidates when the number of the derived spatial merge candidates reaches a second predefined number smaller than the first predefined number.

* * * * *